United States Patent
Newman, Jr. et al.

(10) Patent No.: US 7,312,582 B2
(45) Date of Patent: *Dec. 25, 2007

(54) ELECTRONIC BALLAST

(75) Inventors: Robert C. Newman, Jr., Emmaus, PA (US); Stuart DeJonge, Riegelsville, PA (US); Mark Taipale, Harleysville, PA (US); Dominick Travaglini, Doylestown, PA (US); Joel S. Spira, Coopersburg, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/405,823

(22) Filed: Apr. 18, 2006

(65) Prior Publication Data

US 2006/0186831 A1 Aug. 24, 2006

Related U.S. Application Data

(63) Continuation of application No. 10/795,773, filed on Mar. 8, 2004, now Pat. No. 7,061,189, which is a continuation of application No. 09/887,848, filed on Jun. 22, 2001.

(51) Int. Cl.
*H05B 37/00* (2006.01)
*H05B 37/02* (2006.01)

(52) U.S. Cl. .................. 315/200 R; 315/209 R; 315/291

(58) Field of Classification Search ............ 315/224, 315/225, 291, 307, 308, 247, 244, 209 R, 315/219, 276, DIG. 5, 200 R
See application file for complete search history.

(56) References Cited

U.S. PATENT DOCUMENTS

| | | | |
|---|---|---|---|
| 5,134,355 A * | 7/1992 | Hastings | 323/211 |
| 5,258,692 A | 11/1993 | Jones | 315/247 |
| 5,539,281 A | 7/1996 | Shackle et al. | 315/224 |
| 5,994,847 A | 11/1999 | Konopka | 315/209 |

(Continued)

FOREIGN PATENT DOCUMENTS

| | | |
|---|---|---|
| JP | 6-6979 | 1/1994 |
| JP | 9-154285 | 6/1997 |
| JP | 10-164853 | 6/1998 |
| JP | 2000-270555 A | 9/2000 |

OTHER PUBLICATIONS

Kheraluwala M.H., et al., "Modified valley fill high power factor electronic ballast for compact fluorescent lamps", Power Electronics Specialists Conference, 1995. PESC'95 Record, 26th Annual IEEE Atlanta, GA USA Jun. 18-22, 1995, New York, NY, USA, IEEE, US Jun. 18, 1995, pp. 10-14, ISBN: 0-7803-2730-6.

(Continued)

*Primary Examiner*—Thuy Vinh Tran
(74) *Attorney, Agent, or Firm*—Ostrolenk, Faber, Gerb & Soffen, LLP

(57) ABSTRACT

An electronic ballast for driving at least one lamp comprising a rectifying circuit operatively connectable to an AC line; a current drawing circuit connected across said rectifying circuit; and an inverter circuit connected to said rectifying circuit that supplies a lamp current to said at least one lamp; wherein said current drawing circuit draws current from said AC line when the instantaneous voltage of said AC line nears zero to reduce the total harmonic distortion of the input current drawn by said ballast.

16 Claims, 26 Drawing Sheets

U.S. PATENT DOCUMENTS

| | | | |
|---|---|---|---|
| 6,023,037 A | 2/2000 | Church et al. | 219/121.39 |
| 6,061,259 A | 5/2000 | DeMichele | 363/125 |
| 6,359,395 B1 | 3/2002 | Quazi et al. | 315/307 |

OTHER PUBLICATIONS

Pephany, S., "Mosfet Switch Provides Efficient AC/DC Conversion", EDN Electrical Design News, Cahners Publishing Co., Newtown, MA, US, vol. 45, No. 2, Feb. 17, 2000, p. 149, ISSN: 0012-7515.

Alonso J.M., et al., "Evaluation of a novel single-stage high-power-factor electronic ballast based on integrated buck half-bridge resonant inverter", Applied Power Electronics Conference and Exposition, 2000. APEC 2000. Fifteenth Annual IEEENew Orleans, LA, USA Feb. 6-10, 2000, Piscataway, NJ, USA, IEEE, US, Feb. 6, 2000, pp. 610-616, ISBN: 0-7803-5864-3.

Ribas, J. et al., "A New Discharge Lamp Ballast Based on a Self-Oscillating Full-Bridge Inverter Integrated with a Buck-Type PFC Circuit", APEC 2001. 16th Annual IEEE Applied Power Electronics Conference and Exposition. Anaheim,CA Mar. 4-8, 2001, Annual Applied Power Electronics Conference, New York, NY: IEEE, US, vol. 2 of 2. Conf. 16, Mar. 4, 2001, pp. 688-694, ISBN: 0-7803-6618-2.

Yong-Sik Youn et al, "A unity power factor electronic ballast for fluorescent lamp having improved valley fill and valley boost converter", Power Electronics Specialists Conference, 1997. PESC '97 Record., 28th Annual IEEE St. Louis, MO, USA Jun. 22-27, 1997, New York, NY, USA, IEEE, US, vol. 1, Jun. 22, 1997, pp. 53-59.

Gyun Chae et al, "High power factor correction circuit using valley charge-pumping for low cost electronic ballasts", Power Electronics Specialists Conference, 1998. PESC 98 Record. 29th Annual IEEE Fukuoka, Japan May 17-22, 1998, New York, NY USA, IEEE, US, vol. 2, May 17, 1998, pp. 2003-2008.

Yaow-Ming Chen et al, "PWM control using a modified triangular signal", Industrial Electronisc Society, 1999. IECON '99 Proceedings. The 25th Annual Conference of the IEEE San Jose, CA, USA, Nov. 29-Dec. 3, 1999, Piscataway, NJ, USA, IEEE, US, vol. 1, Nov. 29, 1999, pp. 312-317.

\* cited by examiner

ELECTRONIC BALLAST

CROSS REFERENCE TO RELATED APPLICATIONS

This application is a continuation of U.S. patent application Ser. No. 10/795,773, filed Mar. 8, 2004 by Robert C. Newman, Jr. et al. entitled "ELECTRONIC BALLAST" which is now U.S. Pat. No. 7,061,189, which is a continuation of U.S. patent application Ser. No. 09/887,848, filed Jun. 22, 2001 by Robert S. Newman, Jr., et al. entitled "ELECTRONIC BALLAST" both of which are assigned to the assignee herein and the entire contents of these applications being expressly incorporated herein by reference.

BACKGROUND OF THE INVENTION

The present invention relates to electronic ballasts and, more particularly, to electronic dimming ballasts for gas discharge lamps, such as fluorescent lamps.

Electronic ballasts for fluorescent lamps typically can be analyzed as comprising a "front end" and a "back end". The front end typically includes a rectifier for changing alternating current (AC) mains line voltage to a direct current (DC) bus voltage and a filter circuit for filtering the DC bus voltage. Electronic ballasts also often use a boost circuit for boosting the magnitude of the DC bus voltage. The filter circuit typically comprises a capacitive low-pass filter.

The ballast back end typically includes a switching inverter for converting the DC bus voltage to a high-frequency AC voltage, and a resonant tank circuit having a relatively high output impedance for coupling the high-frequency AC voltage to the lamp electrodes. The ballast back end also typically includes a feedback circuit that monitors the lamp current and generates control signals to control the switching of the inverter so as to maintain a desired lamp current magnitude.

In order to maintain stable lamp operation, typical prior art electronic ballasts filter the DC bus voltage to minimize the amount of bus voltage ripple. This is usually accomplished by providing a bus capacitor having a relatively large capacitance and hence, a relatively large energy storage capacity. By providing a relatively large bus capacitor, the amount of decay from the rectified peak voltage is minimized from one half-cycle to the next half-cycle. Minimizing the amount of ripple on the DC bus also tends to minimize the current crest factor (CCF) of the lamp current. The CCF is defined as the ratio of the magnitude of the peak lamp current to the magnitude of the root-mean-square (RMS) value of the lamp current.(Equation 1)

$$CCF \equiv \frac{I_{pk}}{I_{RMS}} \quad \text{(Equation 1)}$$

However, using a relatively large bus capacitor to minimize ripple on the DC bus voltage comes with its disadvantages. The bus capacitor must be fairly large, and is therefore more expensive and consumes more area on a printed circuit board, or the like, and volume within the ballast. Also, because the bus capacitor is discharging whenever the bus voltage level is above the absolute value of the AC mains voltage, the bus capacitor is recharging during a relatively short duration of each line half-cycle centered about the peak of the line voltage. This results in the typical prior art ballast having a tendency to draw a relatively large amount of current during the time that the bus capacitor is charging, as shown in FIG. 1. Consequently, this results in a distorted input current waveform giving rise to unwanted harmonics and undesirable total harmonic distortion (THD) and power factor for the ballast.

One approach to lowering the THD and improving the ballast power factor has been to employ an active power factor correction (APFC) circuit. This approach has resulted in tradeoffs. Using an APFC circuit results in added ballast complexity, more components, greater cost, lower reliability, and possibly increased power consumption. Moreover, the ballast typically uses a relatively large bus capacitor with its attendant disadvantages as noted above.

Another approach to lowering THD and improving ballast power factor has been to employ a valley-fill circuit between a rectifier and an inverter. One disadvantage of typical prior art valley-fill circuits is that they can have greater bus ripple, which results in higher lamp CCF, which can in turn shorten lamp life.

Prior art approaches to providing electronic ballasts having improved power factor are and THD are discussed in T.-F. Wu, Y.-J. Wu, C.-H. Chang and Z.-R. Liu, "Ripple-Free, Single-Stage Electronic Ballasts with Dither-Booster Power Factor Corrector", IEEE Industry Applications Society Annual Meeting, pp. 2372-77, 1997; Y.-S. Youn, G. Chae, and G.-H. Cho, "A Unity Power Factor Electronic Ballast for Fluorescent Lamp having Improved Valley Fill and Valley Boost Converter", IEEE PESC97 Record, pp. 53-59, 1997; and G. Chae, Y.-S. Youn, and G.-H. Cho, "High Power Factor Correction Circuit using Valley Charge-Pumping for Low Cost Electronic Ballasts", IEEE 0-7803-4489-8/98, pp. 2003-8, 1998.

Prior art patents representative of attempts to provide electronic ballasts having improved power factor and THD include U.S. Pat. No. 5,387,847, "Passive Power Factor Ballast Circuit for the Gas Discharge Lamps", issued Feb. 7, 1995 to Wood; U.S. Pat. No. 5,399,944, "Ballast Circuit for Driving Gas Discharge", issued Mar. 21, 1995 to Konopka et al.; U.S. Pat. No. 5,517,086, "Modified Valley Fill High Power Factor Correction Ballast", issued May 14, 1996 to El-Hamamsy et al.; and U.S. Pat. No. 5,994,847, "Electronic Ballast with Lamp Current Valley-Fill Power Factor Correction", issued Nov. 30, 1999.

SUMMARY OF THE INVENTION

In accordance with a first feature of the invention, a novel electronic ballast for driving a gas discharge lamp includes a rectifier to convert an AC mains input voltage to a rectified pulsating voltage, a valley-fill circuit including an energy storage element to which energy is delivered through a switched impedance to fill the valleys between successive rectified voltage peaks to produce a substantially DC bus voltage, a DC-to-AC voltage inverter having series-connected switching devices to convert the substantially DC bus voltage to a high-frequency AC voltage signal for driving the gas discharge lamp, a resonant tank for coupling the high-frequency AC voltage signal to the gas discharge lamp, and a control circuit for controlling the switching action of the switching devices to deliver a desired current to the gas discharge lamp.

In a preferred embodiment of the ballast, the energy storage element of the valley-fill circuit includes a bus capacitor that stores energy during a first predetermined charging portion of each half-cycle of the AC mains voltage, and delivers energy to the gas discharge lamp during a second predetermined discharge portion of each half-cycle of the AC mains voltage. The switched impedance of the valley-fill circuit includes a resistor in series with a controllably conductive device (a field effect transistor), through which the bus capacitor is charged.

In an alternative embodiment, the energy storage device of the valley-fill circuit includes a bus capacitor, and the switched impedance includes a buck inductor in series with a field effect transistor, connected together in a buck converter configuration. The bus capacitor stores energy during a first predetermined charging portion of each half-cycle of the AC mains voltage, and delivers energy to the gas discharge lamp during a second predetermined discharge portion of each half-cycle of the AC mains voltage. The buck inductor stores energy in response to conduction of the field effect transistor during the charging period of the bus capacitor, and transfers the stored energy to the bus capacitor in response to non-conduction of the field effect transistor during the charging period of the bus capacitor.

In an alternative embodiment, the buck inductor is provided with a tap connected to the bus voltage through a commutation diode to provide different energy storage and energy transfer times.

In accordance with a second feature of the invention, a novel electronic ballast for driving a gas discharge lamp includes a rectifier to convert an AC mains input voltage to a rectified pulsating voltage, a valley-fill circuit to fill the valleys between successive rectified voltage peaks to produce a substantially DC bus voltage, a DC-to-AC voltage inverter having series-connected switching devices to convert the substantially DC bus voltage to a high-frequency AC voltage signal for driving the gas discharge lamp, a resonant tank for coupling the high-frequency AC voltage signal to the gas discharge lamp, a control circuit for controlling the switching action of the switching devices to deliver a desired current to the gas discharge lamp, and means for drawing input current near the zero crossing of the AC mains input voltage waveform so that the input current THD is substantially reduced, and the power factor of the ballast is increased.

In a preferred embodiment of the ballast, the means for drawing current near the zero crossing is a cat ear power supply that supplies the power necessary to operate the control circuit. The cat ear power supply draws current from the AC mains from near the zero crossing of the AC mains voltage at either the leading edge of each half-cycle, or the trailing edge of each half-cycle, or both. The cat ear power supply derives its name from the shape of its input current waveform which "fills in" the current waveform drawn by the ballast from the AC mains around the zero crossings. The cat ear power supply may be provided with circuitry that "cuts in" and "cuts out" the power supply in response to fixed input voltage levels. Alternatively, the cat ear power supply may be provided with circuitry to monitor the current drawn by the ballast back end and cause the power supply to draw input current only when the back end is not drawing current.

DETAILED DESCRIPTION OF THE INVENTION

Figure 1:
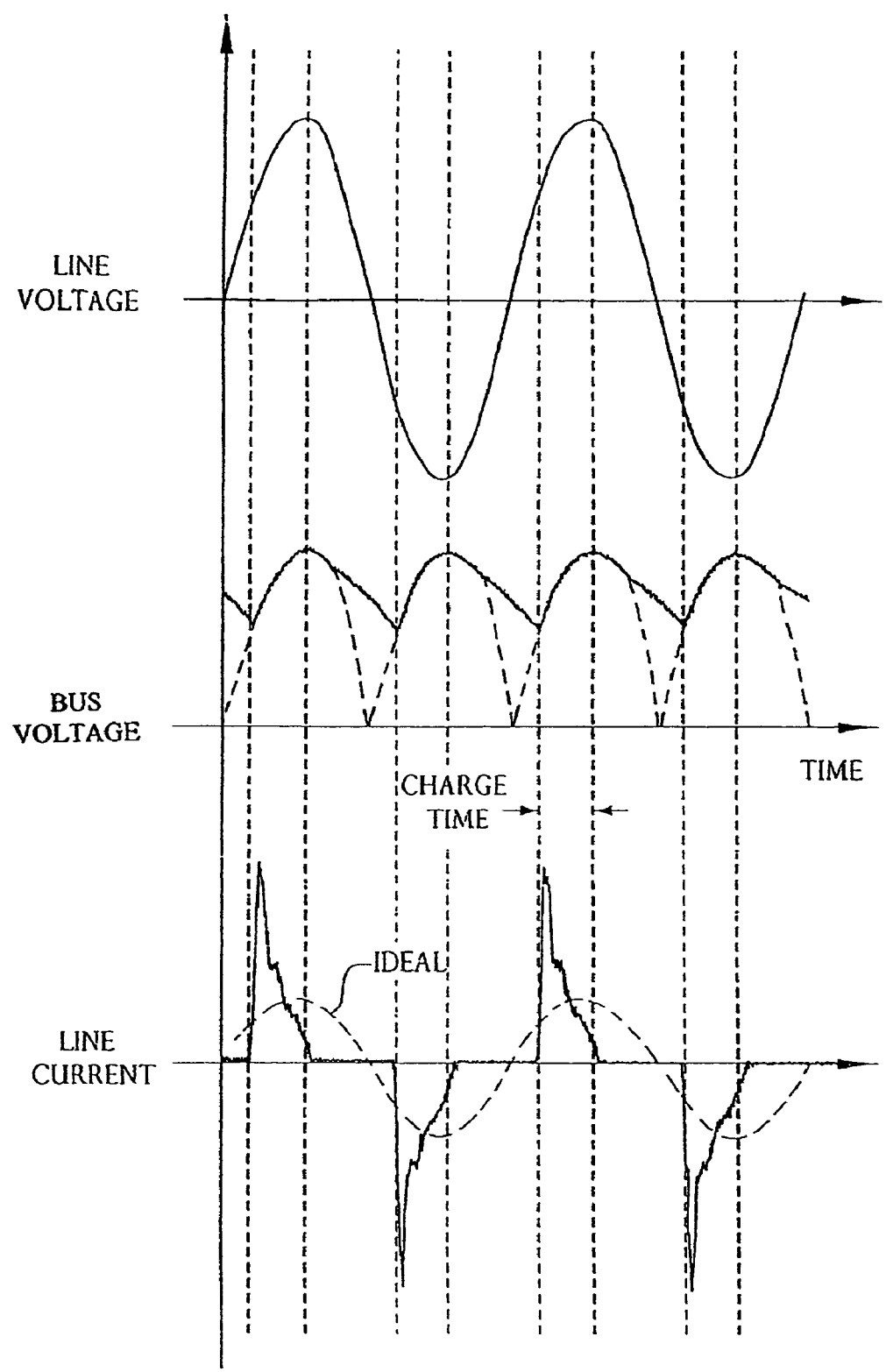
FIG. 1 is a representation of voltage and current waveforms in a prior art electronic ballast with no APFC or valley-fill circuits with idealized waveforms shown as dashed lines.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Ballast Overview

Figure 2:
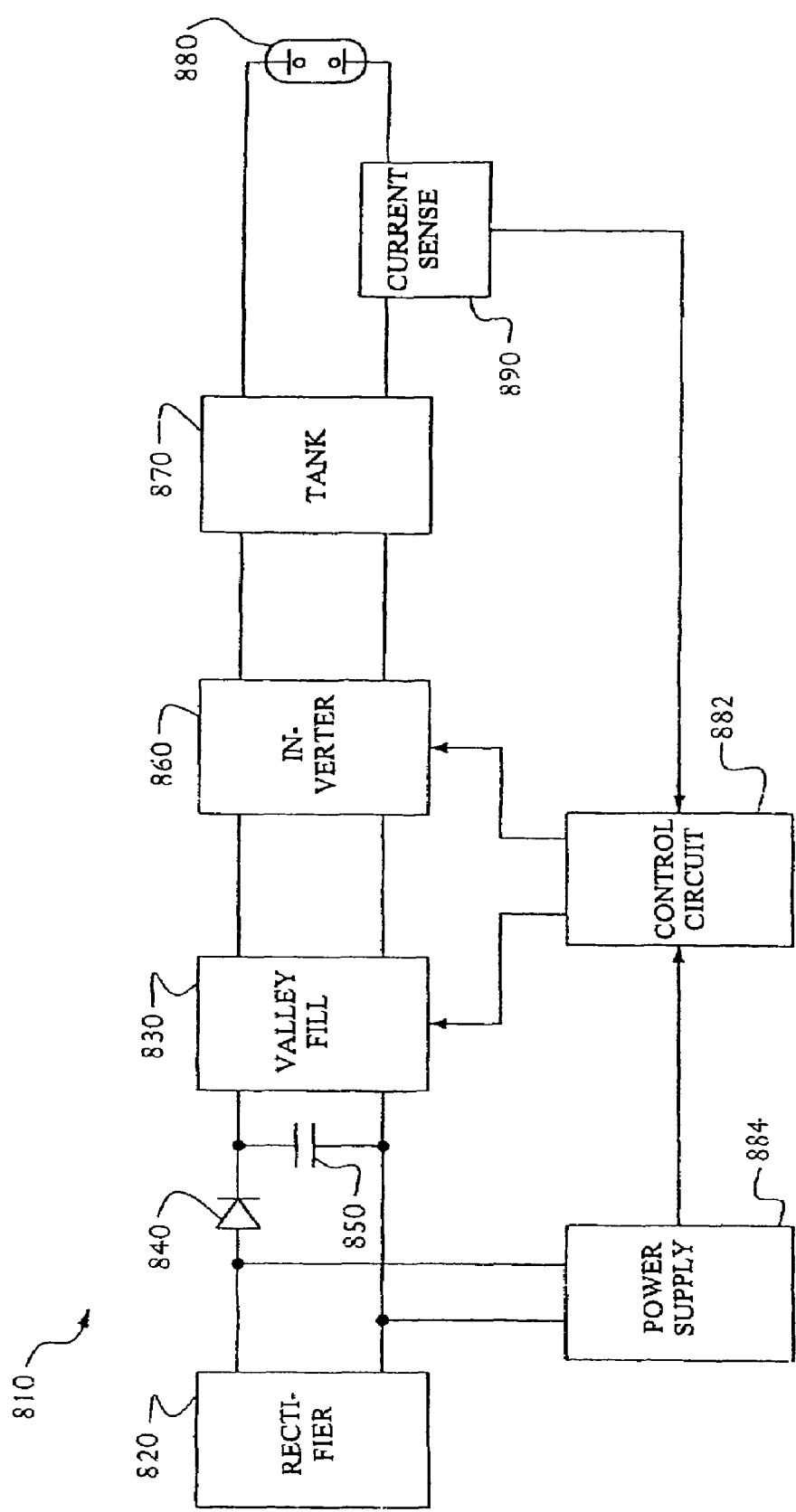
FIG. 2 is a simplified block diagram of the electronic ballast of the invention.

Referring first to FIG. 2, there is shown a simplified schematic diagram of an electronic ballast 810 constructed in accordance with the invention. The ballast 810 includes a rectifier 820 capable of being connected to an AC power supply such as a typical 60 Hz AC main. The rectifier 820 converts the AC input voltage to a rectified pulsating DC voltage. The rectifier 820 is connected to a novel valley-fill circuit 830, to be described, through a diode 840. A high-frequency filter capacitor 850 is connected across the inputs to the valley-fill circuit 830. The valley-fill circuit 830 selectively charges and discharges an energy-storage device so as to reduce the amount of bus voltage ripple. The outputs of the valley-fill circuit 830 are in turn connected to the inputs to an inverter 860. The inverter 860 converts the rectified DC voltage to a high-frequency AC voltage. The outputs of the inverter 860 are connected to an output circuit 870, which typically includes a resonant tank, and may also include a coupling transformer. The output circuit filters the inverter 860 output to supply essentially sinusoidal voltage, as well as provide voltage gain and increased output impedance. The output circuit 870 is capable of being connected to drive a load 880 such as a gas discharge lamp; for example, a fluorescent lamp. An output current sense circuit 890 coupled to the load 880 provides load current feedback to a control circuit 882. The control circuit 882 generates control signals to control the operation of the valley-fill circuit 830 and the inverter 860 so as to provide a desired load current to the load 880. A power supply 884 is connected across the outputs of the rectifier 820 to provide the necessary power for proper operation of the control circuit 882.

The Valley-Fill Circuit

Figure 3:
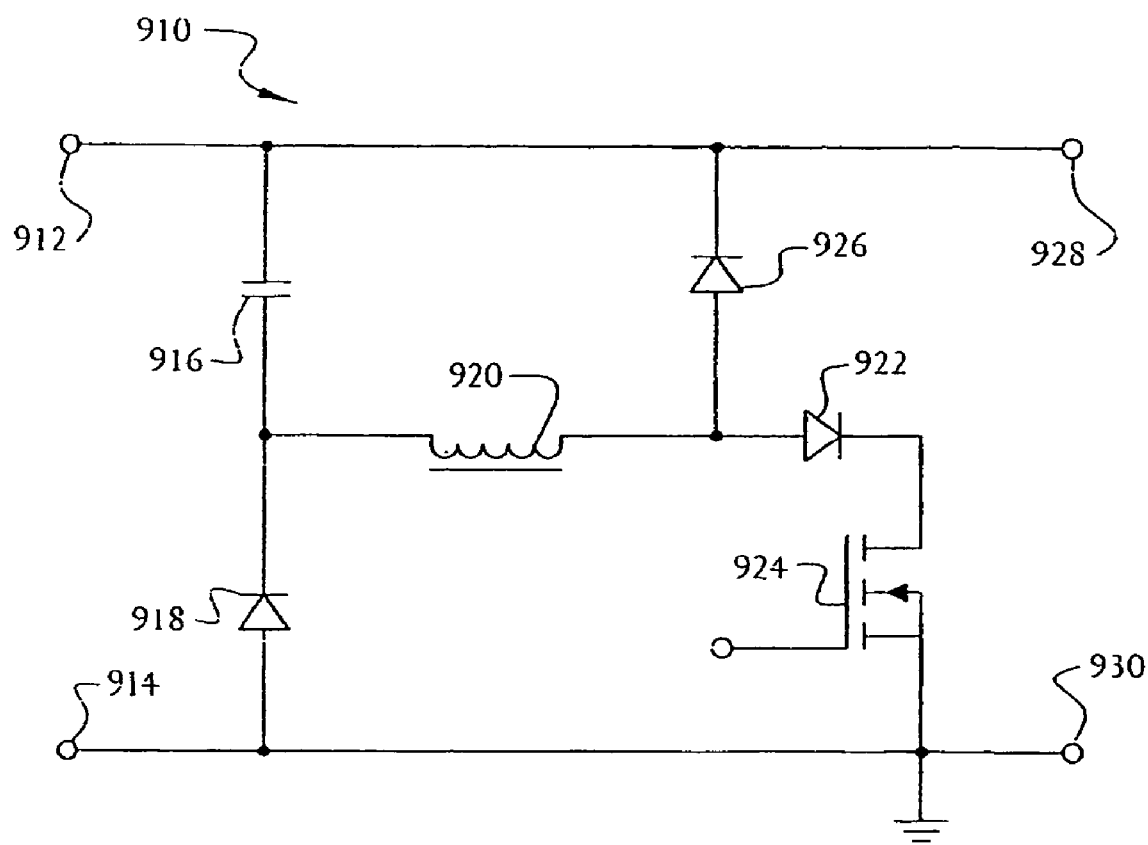
FIG. 3 is a simplified schematic diagram of a first embodiment of a valley-fill circuit using a buck converter for use in an electronic ballast of the invention.

Turning now to FIG. 3, there is shown a schematic diagram of a first embodiment 910 of the valley-fill circuit 830 of FIG. 2 in the form of a buck converter. Connected across first and second input terminals 912 and 914 is an energy-storage device 916, in the form of a bus capacitor, in series with a first diode 918. The function of the buck converter 910 is to provide a controlled charging current for the bus capacitor 916. Connected to the junction of the bus capacitor 916 and the cathode of the first diode 918 is a buck inductor 920 which is connected in series with a second (optional) diode 922 and a controllably conductive switch 924 to a circuit common. Switch 924 is shown as a metal-oxide-silicon field-effect transistor (MOSFET), but may be a bipolar junction transistor (BJT), insulated gate bipolar transistor (IGBT), or other controllably conductive switching device. The buck converter 910 also includes a third commutating diode 926, which may also be a suitably controlled synchronous rectifier or FET, connected between the junction of the buck inductor 920 and the second diode 922, and the end of the bus capacitor 916 connected to the input 912. A first output terminal 928 is connected to input terminal 912, bus capacitor 916, and the cathode of commutating diode 926. A second output terminal 930 is connected to the second input terminal 914, circuit common, the anode of diode 918, and the switch 924.

Figure 4:
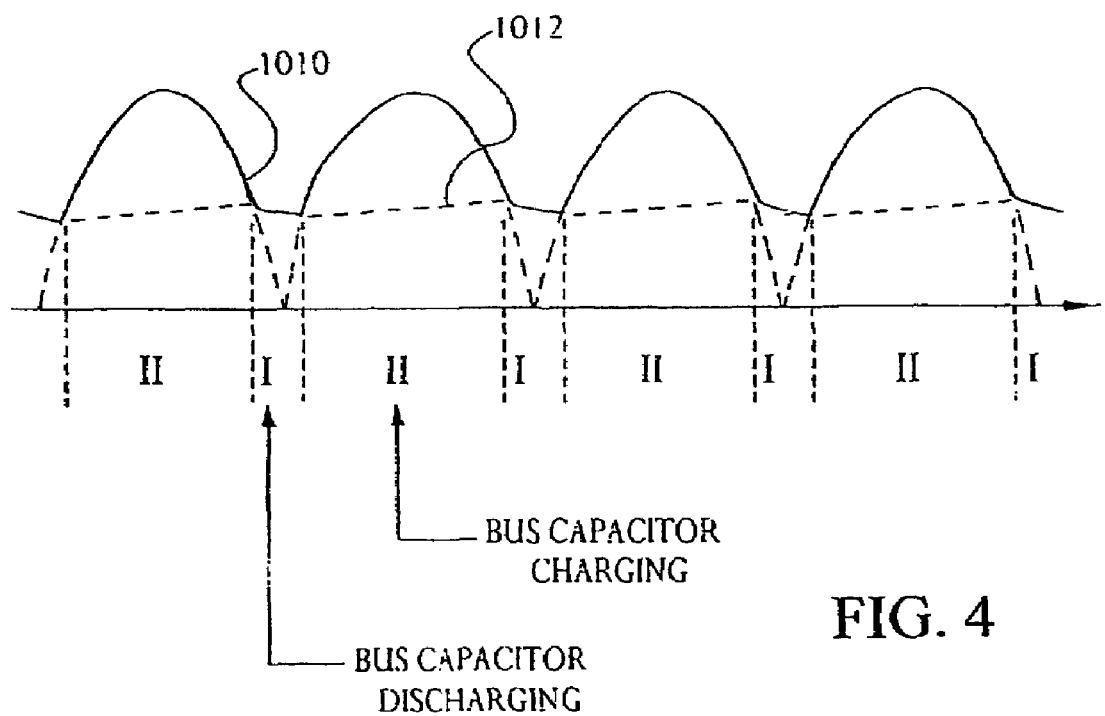
FIG. 4 is a simplified representation of bus voltage in the buck converter of FIG. 3 illustrating the method of operation.
Figures 5, 6:
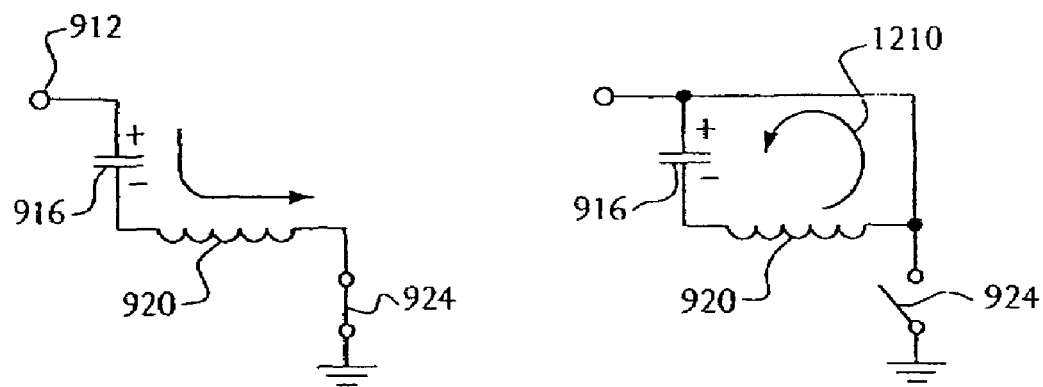
FIG. 5 is a simplified schematic of the buck converter of FIG. 3 illustrating a first mode of operation.
FIG. 6 is a simplified schematic of the buck converter of FIG. 3 illustrating a second mode of operation.

The operation of the buck converter 910 will be described in connection with FIGS. 4, 5, and 6. The buck converter 910 operates under two different conditions. In condition I (interval I in FIG. 4), the instantaneous rectified line voltage 1010 applied to the buck converter 910 is equal to or less than the voltage 1012 across the bus capacitor 916, and the bus capacitor 916 is discharging its stored energy into the inverter. In this condition, the diode 840 (FIG. 2) is reverse biased, and the diode 918 is forward biased into conduction. This establishes a discharge path for the bus capacitor 916 from circuit common 930, through the diode 918 and the bus capacitor 916, to the buck converter output 928. Switch 924 alternately opens and closes at a frequency substantially greater than the frequency of the rectified line voltage, typically about 30 kHz or greater. When the switch 924 is conducting, any residual energy remaining in the buck inductor 920 from the previous charging cycle is discharged through the diode 922 and the switch 924 to circuit common. Thereafter, the diodes 922 and 926 are reverse biased so that no further current flows through the buck inductor 920.

In condition II (interval II in FIG. 4), the instantaneous rectified line voltage is greater than the voltage across the bus capacitor 916, and the bus capacitor 916 is increasing its stored energy. During interval II, the operation of the buck converter depends on the conduction state of the switch 924. When the switch 924 is conducting, the buck converter 910 reduces to the simplified form shown in FIG. 5 and the voltage across the buck inductor 920 is equal to the instantaneous rectified line voltage minus the voltage across the bus capacitor 916. Thus, the bus capacitor 916 is charged by a current flowing from the input 912, through the bus capacitor 916, the buck inductor 920, and the switch 924, to circuit common. When the switch 924 is not conducting (as depicted in FIG. 6), then the current 1210 flowing through the buck inductor 920 commutates through the diode 926 and flows into the bus capacitor 916, thus transferring some or all of the energy stored in the inductor 920 to the bus capacitor 916. Note that in condition II, the bus capacitor 916 is charging both when switch 924 is closed, and when switch 924 is open.

Figure 7:
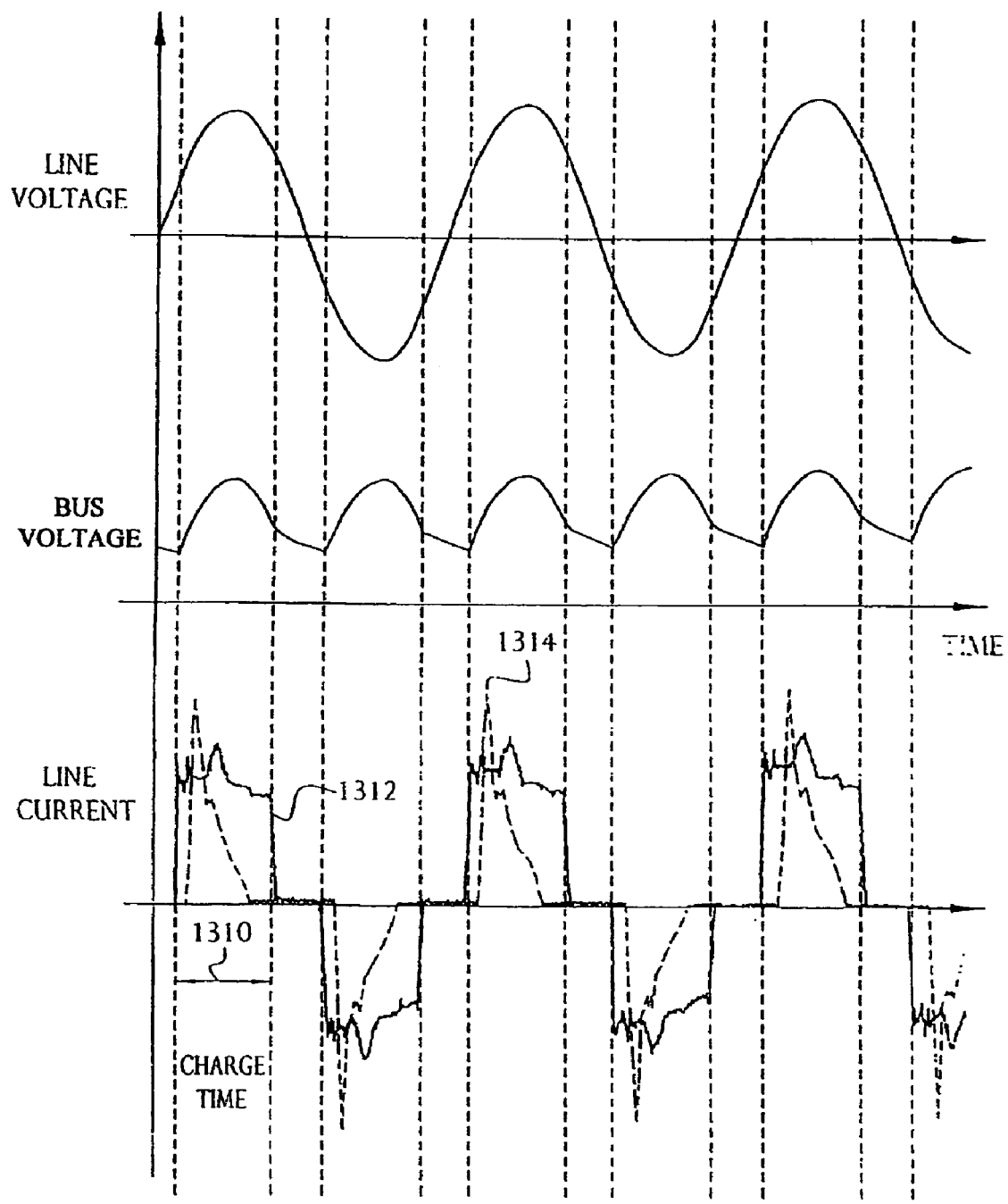
FIG. 7 is a simplified representation of various voltage and current waveforms in an electronic ballast including the buck converter of FIG. 3 at full light output.

The result of the operation of the buck converter 910 is that the bus capacitor 916 charges over a longer period of time 1310, as shown in FIG. 7 wherein the ballast is operating at full light output. The charging of the bus capacitor 916 preferably takes place over more than 90 degrees of each line half cycle. More preferably, the bus capacitor 916 charges for more than 100 degrees of each half cycle. However, as the charging time increases, so too does the bus voltage ripple. Another advantage of the buck converter valley-fill circuit is that the inrush current to the bus capacitor 916 at the beginning of each charge cycle is limited by the buck inductor 920. This can also be seen in FIG. 7 in that the peak line current 1312 is greatly reduced as compared to the peak line current 1314 of typical prior art ballasts having no APFC or valley-fill circuitry. Inrush limiting is even more significant at initial ballast turn-on.

Figure 8:
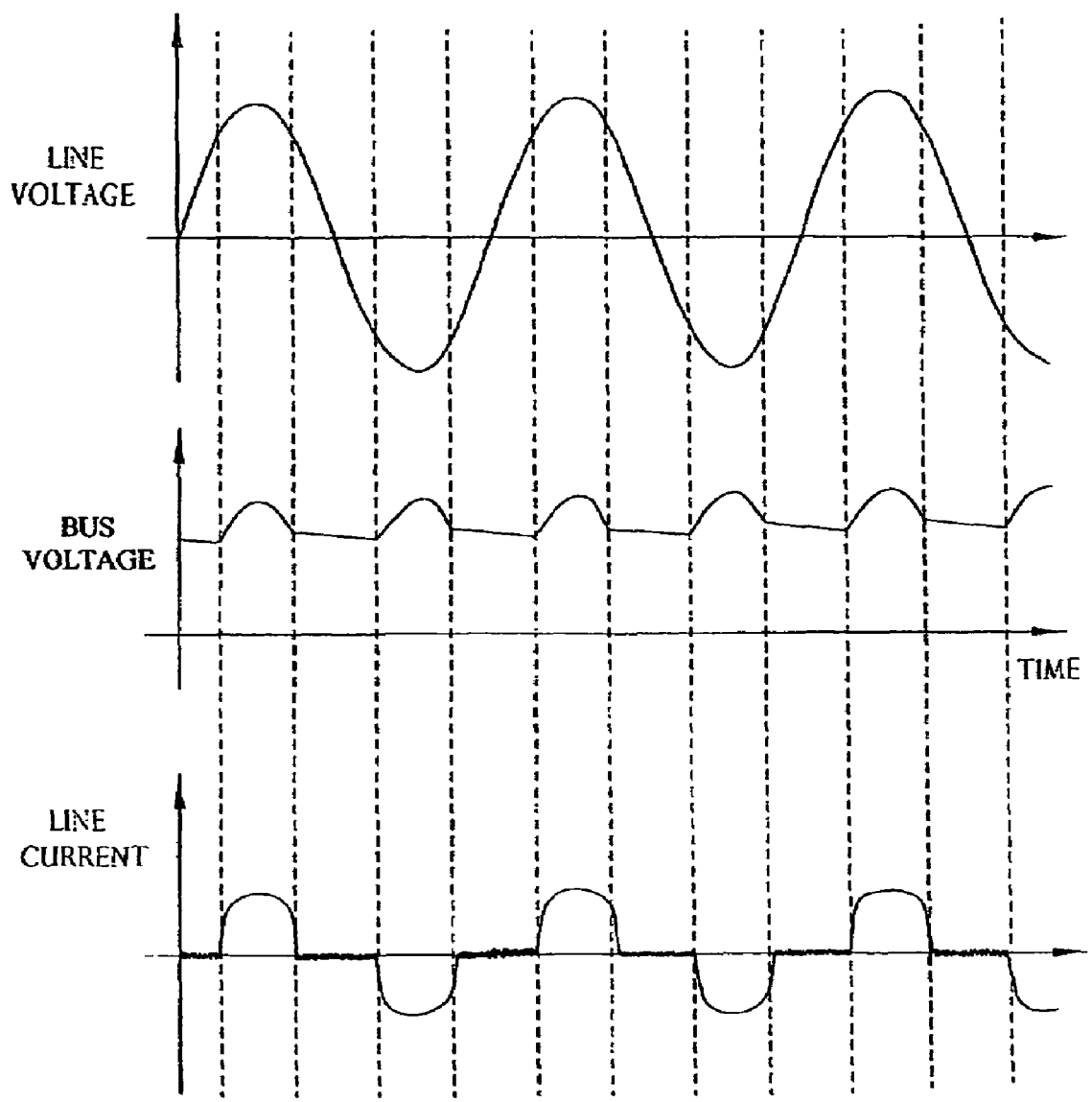
FIG. 8 is a simplified representation of various voltage and current waveforms in an electronic ballast including the buck converter of FIG. 3 at ten percent light output.

Another advantage of the buck converter 910 is that it provides over-voltage protection for the bus capacitor 916. That is, in an unloaded condition, such as when no lamp is present, the bus capacitor 916 will charge to no more than the peak rectified line voltage. This is in contrast to traditional boost and buck-boost converters wherein extra circuitry must be added to prevent charging of the bus capacitor to potentially catastrophically high voltages in an unloaded condition. As shown in FIG. 8, as the lamp is dimmed down to about 10 percent light output, the charging time of the bus capacitor 916 decreases while the ballast input current approaches a smoother, more sinusoidal shape. Simultaneously, the bus ripple is also reduced, leading to lower lamp CCF.

Figure 9:
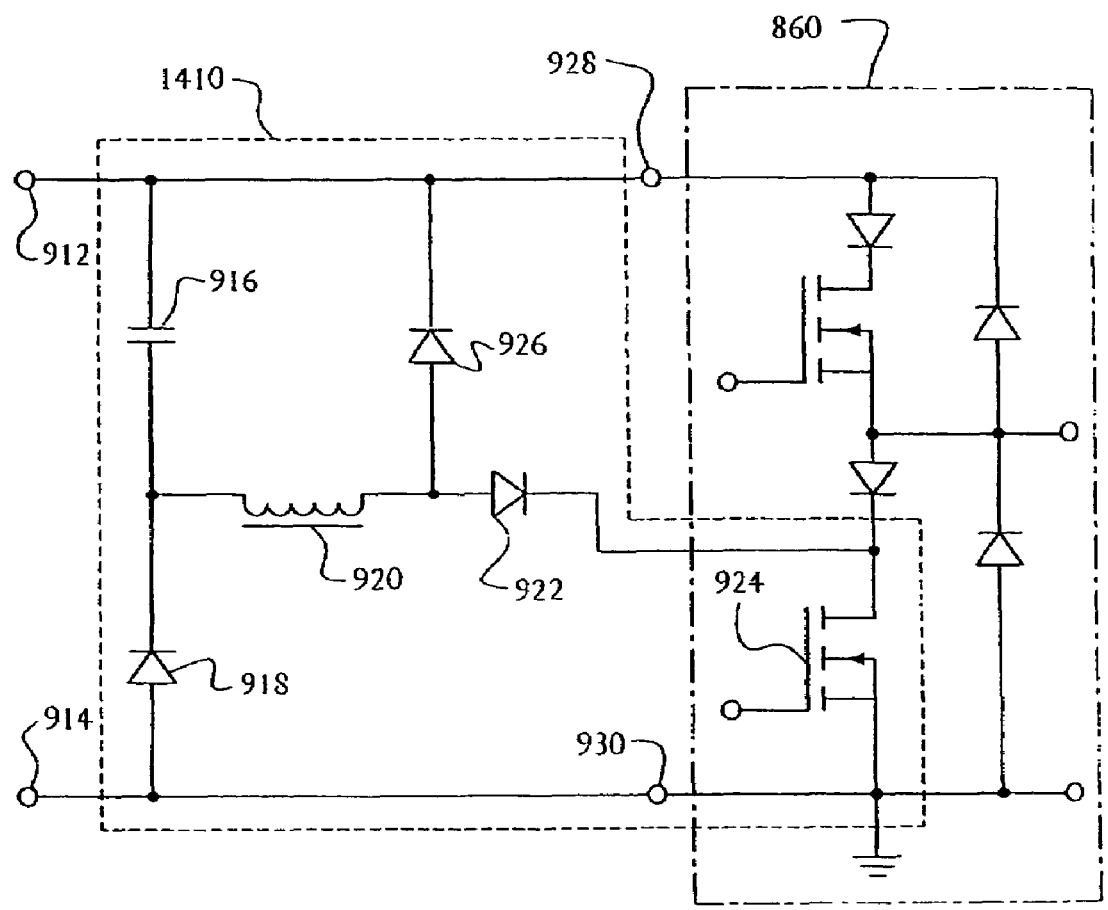
FIG. 9 is a simplified schematic diagram of a second embodiment of a valley-fill circuit having a buck converter integrated with an inverter in accordance with the present invention.
Figure 10:
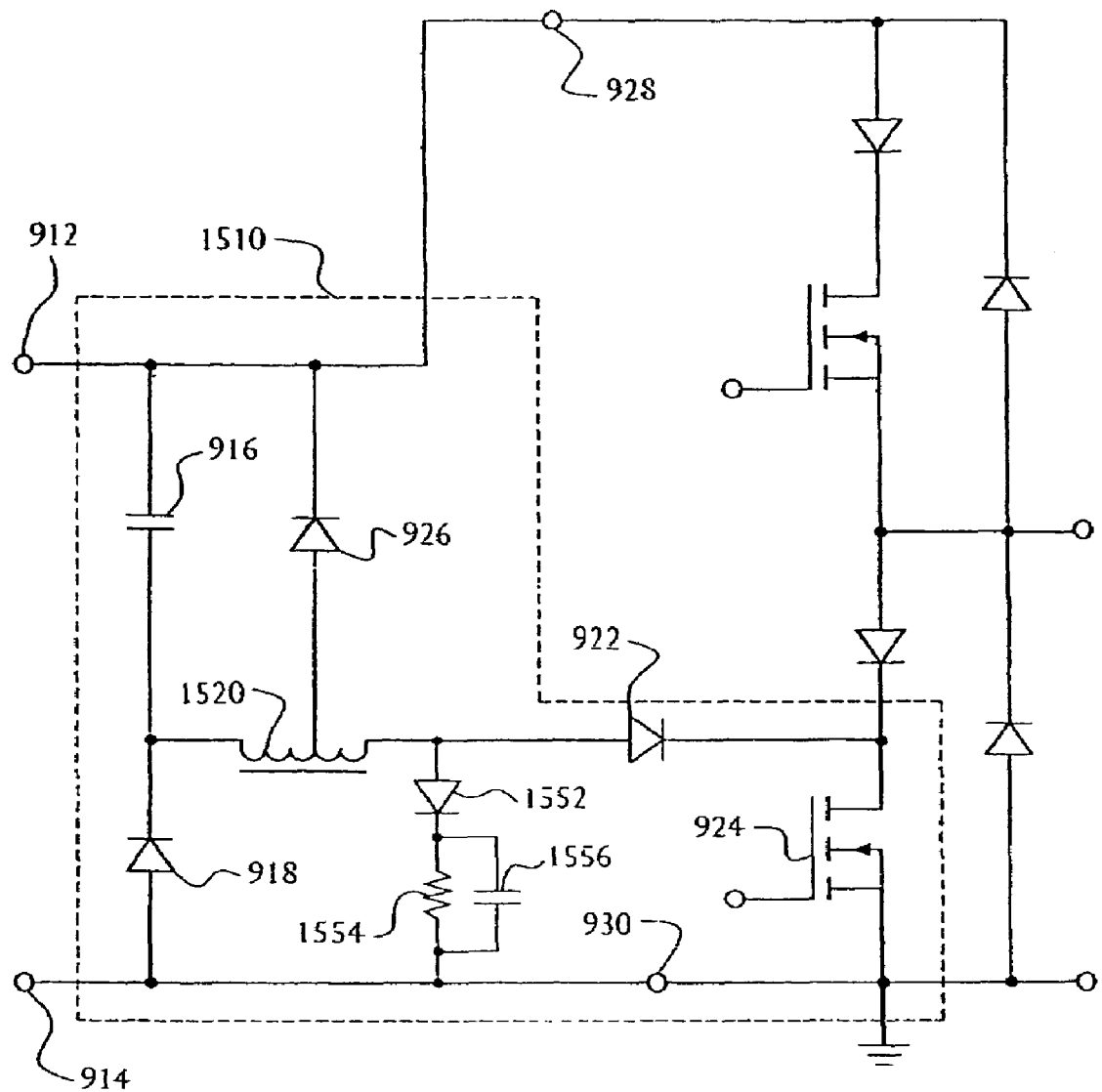
FIG. 10 is a simplified schematic diagram of a third embodiment of a valley-fill circuit having an integrated buck converter with a tapped buck inductor in accordance with the invention.

Turning now to FIG. 9, there is shown a second embodiment 1410 of the buck converter. In this embodiment, the buck converter 1410 and the inverter 860 share the controllably conductive switch 924. The second embodiment 1410 of the buck converter operates essentially in the same way as the first embodiment 910. Turning now to FIG. 10, there is shown a third embodiment 1510 of the buck converter in which the buck inductor 920 is replaced with a tapped inductor 1520 and the anode of the commutation diode 926 is coupled to the inductor 1520 tap, rather than the junction of the inductor 1520 and the diode 922. The inductor tap provides the capability to vary the discharge time of the inductor 1520. The continuous mode operation of the buck converter may be reduced, or eliminated altogether. However, this extra flexibility comes with the tradeoff of extra voltage stress on the switch 924. When the inductor 1520 is transferring energy to the bus capacitor 916, the tapped inductor 1520 acts so that the voltage applied across the switch 924 is equal to the voltage across the capacitor 916 multiplied by the turns ratio of the tapped inductor 1520. A snubber circuit including a snubber diode 1552, in series with the parallel combination of a snubber resistor 1554 and a snubber capacitor 1556, is coupled between the junction of the buck inductor 1520 and the diode 922, and circuit common, to dissipate uncoupled residual energy in the tapped inductor.

In the tapped buck inductor embodiment of FIG. 10, capacitor 916 is a parallel combination of two 47 microfarad, 250 volt capacitors, diodes 918 and 926 are MUR160 diodes, diodes 922 and 1552 are 1000 volt, 1 ampere diodes, resistor 1554 is a series combination of two 91 kilohm, 1 watt resistors, capacitor 1556 is a 0.0047 microfarad, 630 volt capacitor, and switch 924 is a 500 volt IRF1634G MOSFET. The tapped inductor 1520 has a total number of about 180 turns from the cathode of diode 918 to the anode of diode 922, corresponding to an inductance of about 1.427 milliHenries, with the number of turns from the cathode of diode 918 to the tap being about 75, corresponding to an inductance of about 244 microHenries, and the number of turns from the tap to the anode of diode 922 being about 105, corresponding to an inductance of about 492 microHenries.

In each embodiment of the valley-fill circuit 830 (FIG. 2), charging current increases with longer conduction times of the controllably conductive switch. This means that at low end, when the lamp is being dimmed, and the switch is conducting longer, then the accumulated charge is greater, which tends to raise the bus voltage. It is advantageous to have higher bus voltage at low end since the lamp voltage increases at low end and a higher bus voltage allows the lamp to be driven through a higher impedance. Higher output impedance improves lamp stability, as is discussed in U.S. Pat. No. 5,041,763, issued Aug. 20, 1991 to Sullivan et al., and assigned to Lutron Electronics Co., Inc.

The charging current also increases as the voltage differential between the rectified line voltage and the voltage across the bus capacitor increases. This results in the charging current in the buck converter being highest in the middle of the line half cycle, and lower towards the tails of the line half cycle, which in turn results in improved power factor and THD for the ballast.

Figure 11:
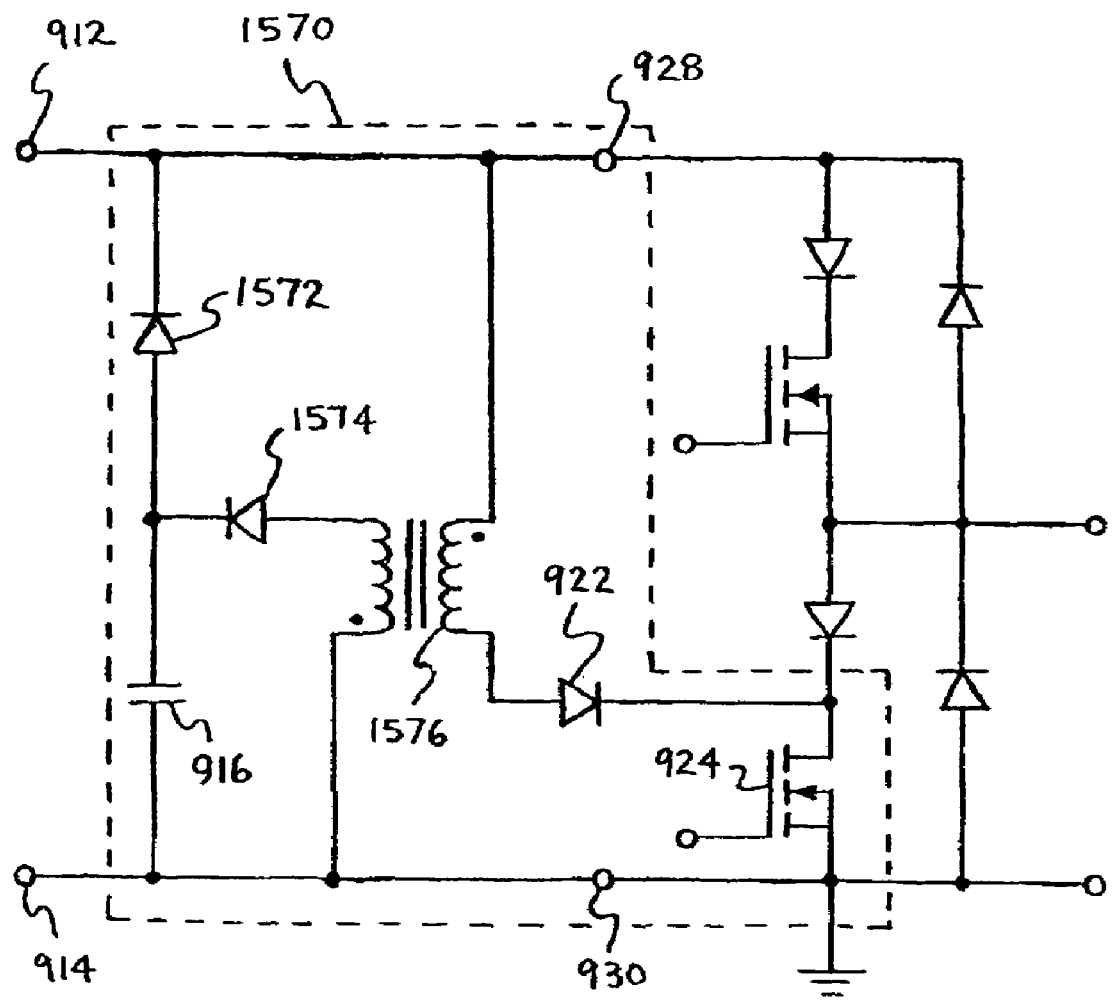
FIG. 11 is a simplified schematic diagram of another alternative embodiment of a valley-fill circuit having a flyback transformer for recharging the bus capacitor.

Turning now to FIG. 11, there is shown another embodiment 1570 of a valley-fill circuit. In this embodiment, the valley-fill circuit 1570 includes, in addition to the bus capacitor 916, the diode 922, and the switch 924, a diode 1572 connected between the capacitor 916 and the terminal 912, and a diode 1574 and a "flyback" transformer 1576. The "primary" winding of the transformer 1576 is connected between the anode of the diode 922 and the terminal 928 of the valley-fill circuit 1570. The "secondary" winding of the transformer 1576 is connected between circuit common and to the anode of the diode 1574, the cathode of which is in turn connected to the junction of the capacitor 916 and the anode of the diode 1572.

When the rectified line voltage exceeds the voltage across the bus capacitor 916, then the voltage developed across the "secondary" winding of the flyback transformer 1576 recharges the bus capacitor 916 through the diode 1574 when the "secondary" winding voltage exceeds the bus capacitor voltage. When the rectified line voltage falls below the voltage across the bus capacitor, then the bus capacitor 916 alternate discharges when the "secondary" winding voltage is lower than the bus capacitor voltage, and recharges when the "secondary" winding voltage exceeds the bus capacitor voltage.

Figure 12:
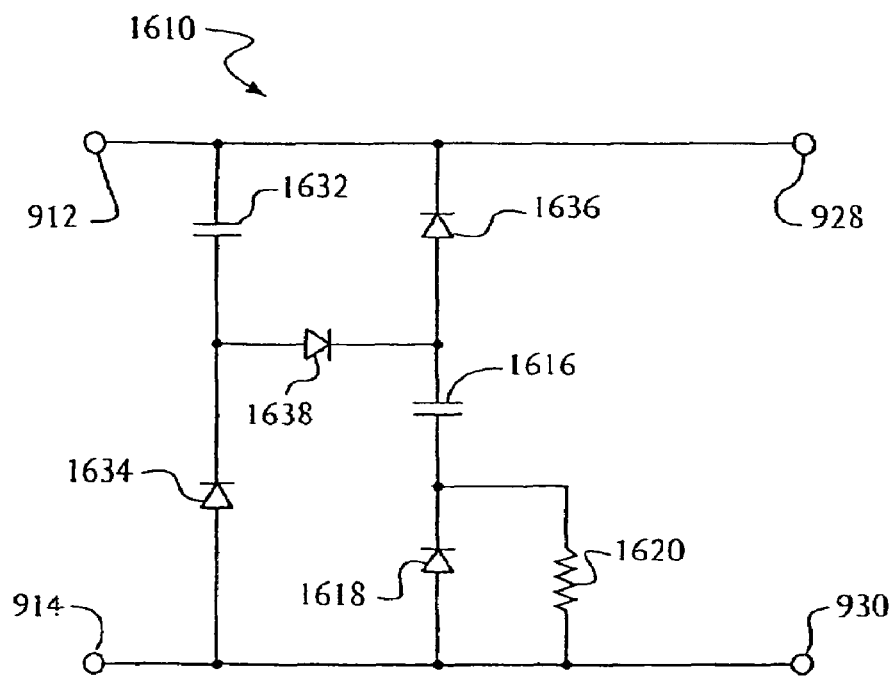
FIG. 12 is a simplified schematic diagram of a fourth embodiment of a valley-fill circuit in accordance with the present invention.

Turning now to FIG. 12, there is shown a fourth embodiment 1610 of a valley-fill circuit. In this embodiment, the valley-fill circuit 1610 includes a first energy storage capacitor 1632 connected in series with a first diode 1634 across first and second input terminals 912, 914 to the circuit 1610. A second energy storage capacitor 1616 is connected in series with a second diode 1636, the cathode of which is tied to the input 912. A third diode 1638 is connected between the junction of capacitor 1632 and diode 1634, and the junction of capacitor 1616 and diode 1636. The other end of energy storage capacitor 1616 is connected to the second input terminal 914 by means of a fourth diode 1618 in parallel with a resistor 1620. When the rectified voltage across the input terminals 912, 914 exceeds the sum of the voltages across the capacitors 1632 and 1616 by the forward voltage drop across the diode 1638, then the diodes 1634, 1636, and 1618 are reverse biased, the diode 1638 is forward biased, and the energy storage capacitors 1632, 1616 charge through the series path of capacitor 1632, diode 1638, capacitor 1616, and resistor 1620. Resistor 1620 limits the inrush charging current into the energy storage capacitors 1632, 1616 to reduce current spikes in the current drawn by the ballast from the line, thereby improving power factor and THD. The capacitors 1632, 1616 typically each have the same value and charge to approximately one-half the peak input voltage. When the rectified voltage across the input terminals 912, 914 falls below the sum of the voltage across capacitors 1632, 1616, then diode 1638 is reverse biased. Once the voltage across the input terminals 912, 914 falls below the voltage across the capacitor 1632 by more than the turn-on voltage of the diode 1634, then capacitor 1632 discharges through diode 1634 and output terminals 928 and 930. Once the voltage across the input terminals 912, 914 falls below the voltage across the capacitor 1616 by more than the turn-on voltage of the diode 1636, then capacitor 1616 discharges through the diode 1636, the resistor 1620, and the output terminals 928, 930. When the voltage drop across the resistor 1620 exceeds the turn-on voltage of the diode 1618, then capacitor 1616 discharges through diodes 1636, 1618 and the output terminals 928, 930.

In summary, the capacitors 1632, 1616 charge in series, and discharge in parallel, delivering their stored energy to the lamp. The amount of ripple in the bus voltage is thereby reduced, which in turn leads to improved current crest factor in the ballast.

The valley-fill circuit 1610 of FIG. 12 differs significantly from the valley-fill circuit of Wood in U.S. Pat. No. 5,387,847. Most notably, Wood, in FIG. 2 of his patent, shows a resistor in series with a diode connected between two capacitors. In contrast, the valley-fill circuit of FIG. 12 provides the resistor 1620 in parallel with the diode 1618, the pair connected between the capacitor 1616 and circuit common. This novel arrangement provides the desired degree of power factor improvement, but does so in a manner that more readily lends itself to additional improvements in power factor.

Figure 13:
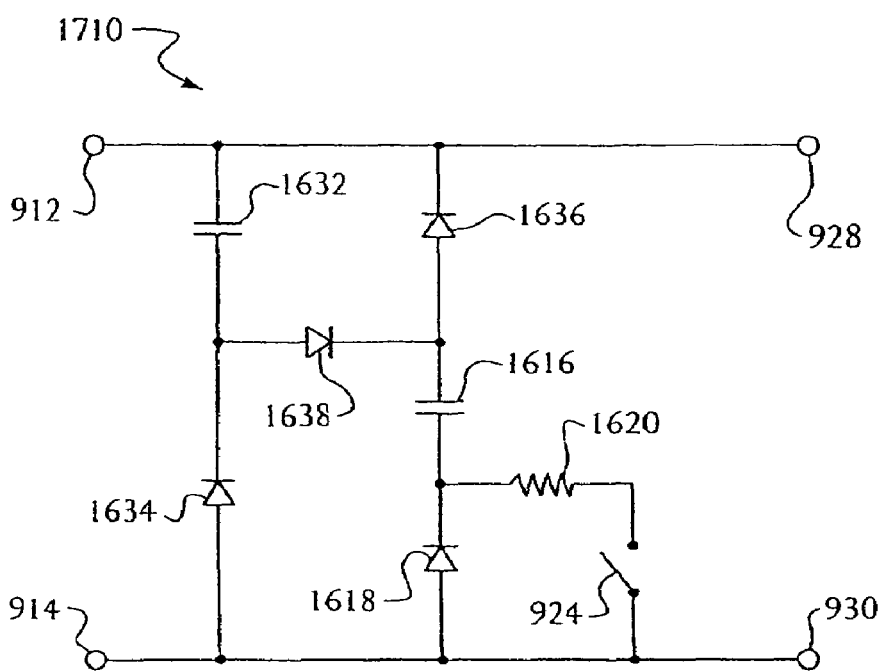
FIG. 13 is a simplified schematic diagram of a fifth embodiment of a valley-fill circuit in accordance with the present invention.

To further improve the power factor of the ballast, the valley-fill circuit 1610 of FIG. 12 may be modified by adding a controllably conductive switch 924 in series with the resistor 1620 as shown in FIG. 13. The switch 924 will typically be operated at a high frequency, that is, many times greater than the fundamental line frequency. The power factor of the ballast may be improved by controlling the switching action of switch 924 so that the conduction time of the switch 924 is reduced near the "tails" or zero crossings of the line voltage, and increased near the center or peak of each line half cycle. This results in a ballast input current waveform that more nearly matches the line voltage waveform.

Figure 14:
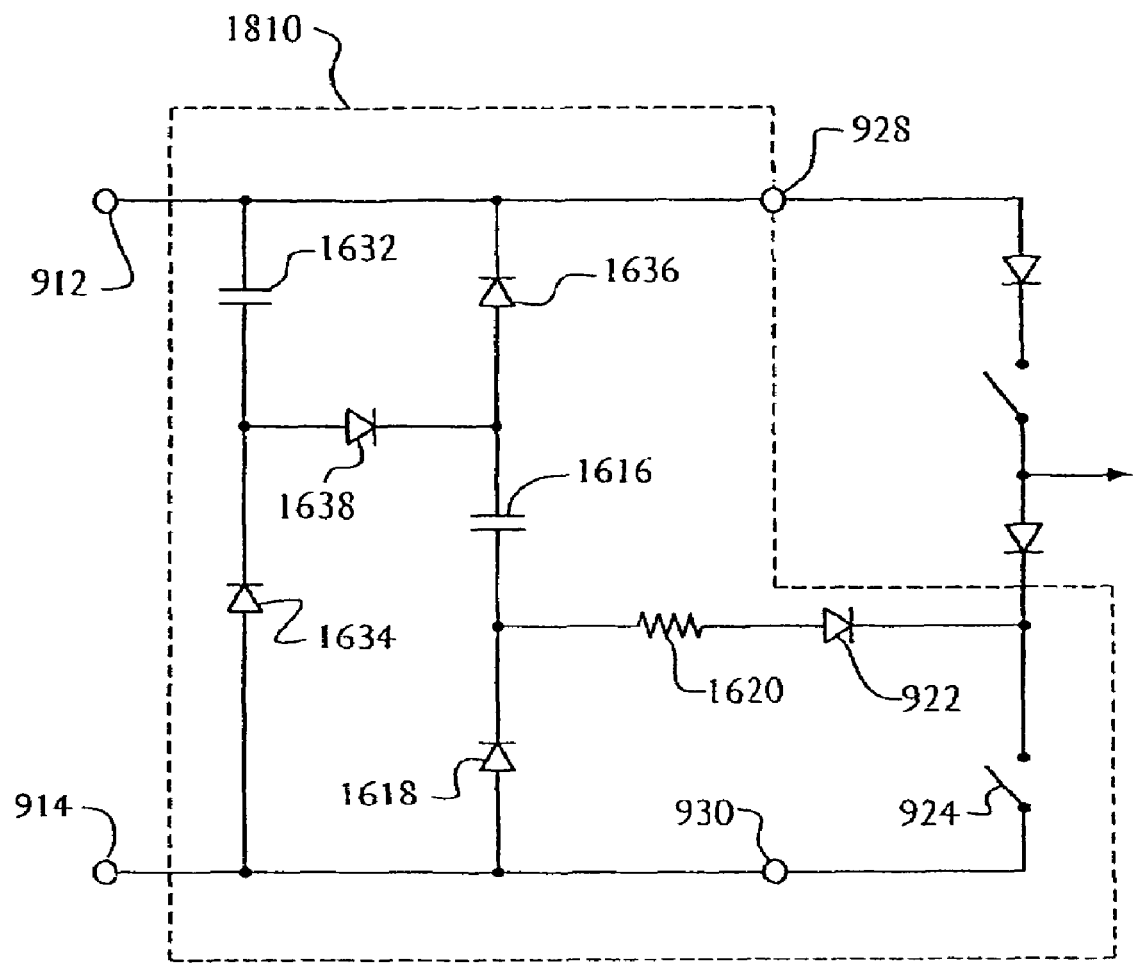
FIG. 14 is a simplified schematic diagram of a sixth embodiment of a valley-fill circuit integrated with an inverter in accordance with the present invention.

The valley-fill circuit 1710 of FIG. 13 may be integrated with the ballast inverter as shown in FIG. 14 wherein the controllable switch 924 is shared by the valley-fill circuit 1810 and the inverter.

Figure 15:
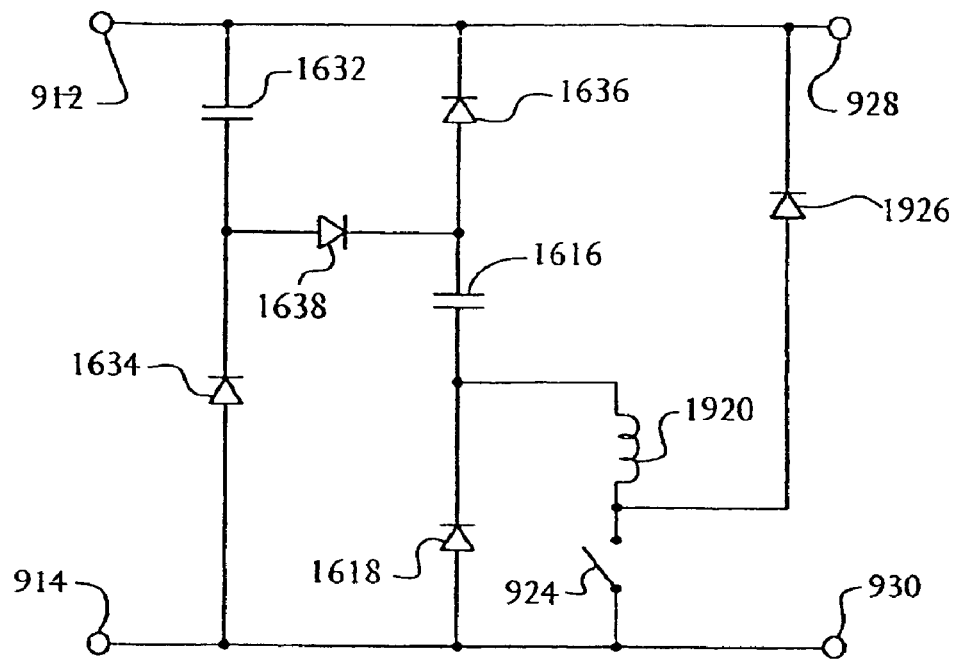
FIG. 15 is a simplified schematic diagram of a seventh embodiment of a valley-fill circuit in accordance with the present invention.

Resistive losses in the valley-fill circuit 1710 of FIG. 13 may be reduced as shown in FIG. 15 by replacing resistor 1620 with an inductor 1920 in series with switch 924. In an alternative arrangement, the combination of the inductor 1920 and the switch 924 may be replaced by a single large inductor. However, the high-frequency switching action of switch 924 permits a relatively small, and inexpensive, inductor 1920 to be used.

Figure 16:
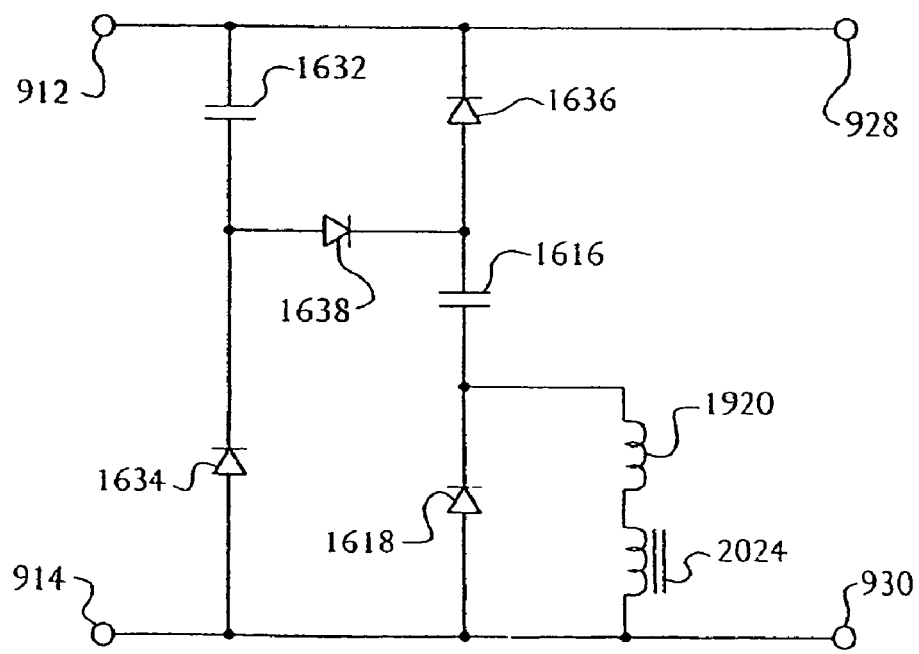
FIG. 16 is a simplified schematic diagram of an eighth embodiment of a valley-fill circuit in accordance with the present invention.

As an alternative to switch 924, a secondary winding 2024 from a high-frequency transformer may be substituted as shown in FIG. 16. High-frequency transformers are typically present in ballasts. By the addition of the proper number of turns of a secondary winding (preferably to an already existing transformer), a voltage of alternating polarity may be introduced in series with inductor 1920, alternately opposing and aiding the flow of current through the inductor 1920. The winding 2024 thereby effectively functions as a switch. The high-frequency "switching" action of the winding 2024 causes the inductor 1920 to present a higher effective impedance to the current flowing therethrough, thereby allowing a relatively small-valued inductor to be used.

The Inverter

Figure 17:
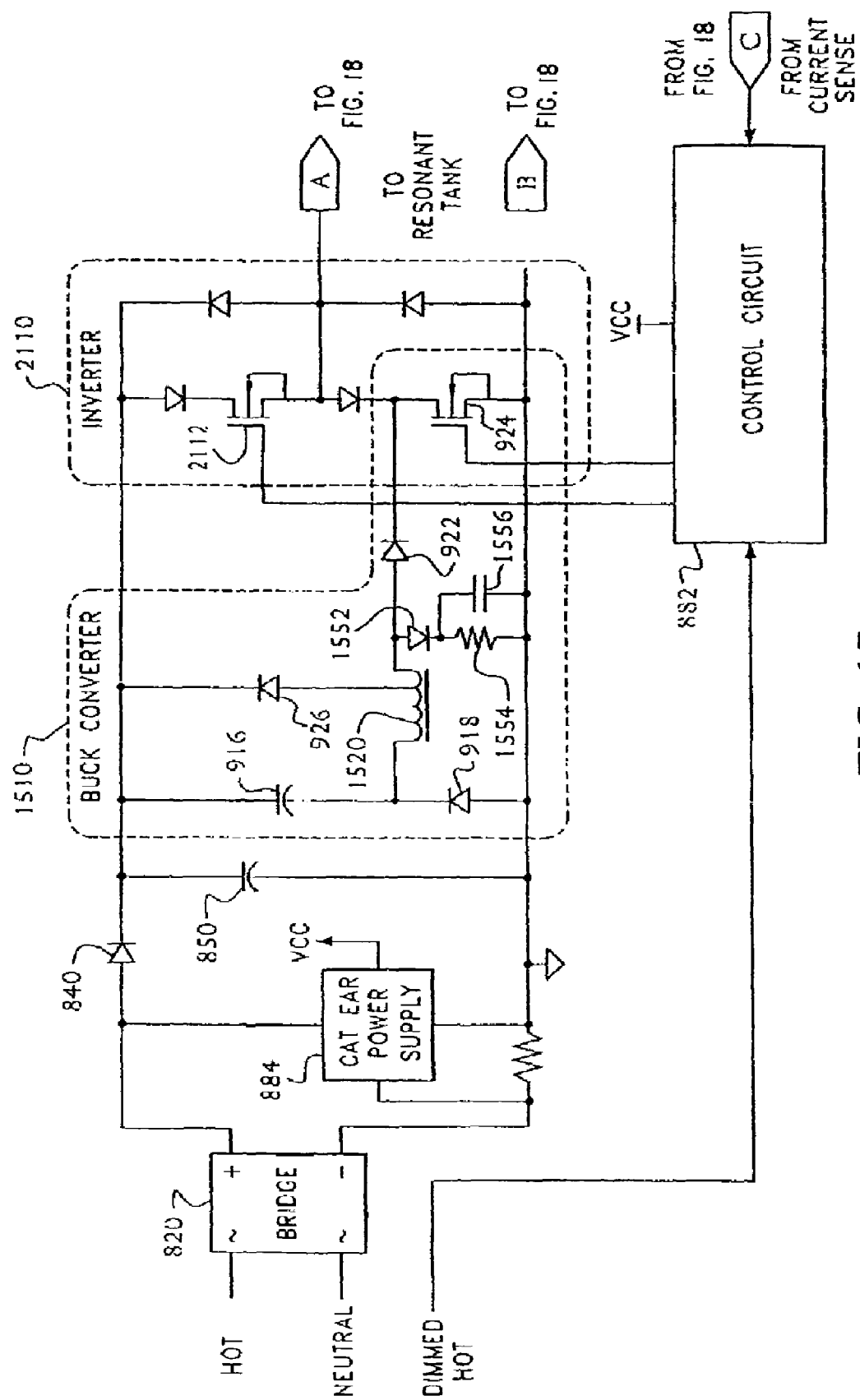
FIGS. 17 and 18 are simplified schematic diagrams of a ballast constructed in accordance with the invention.
Figure 18:
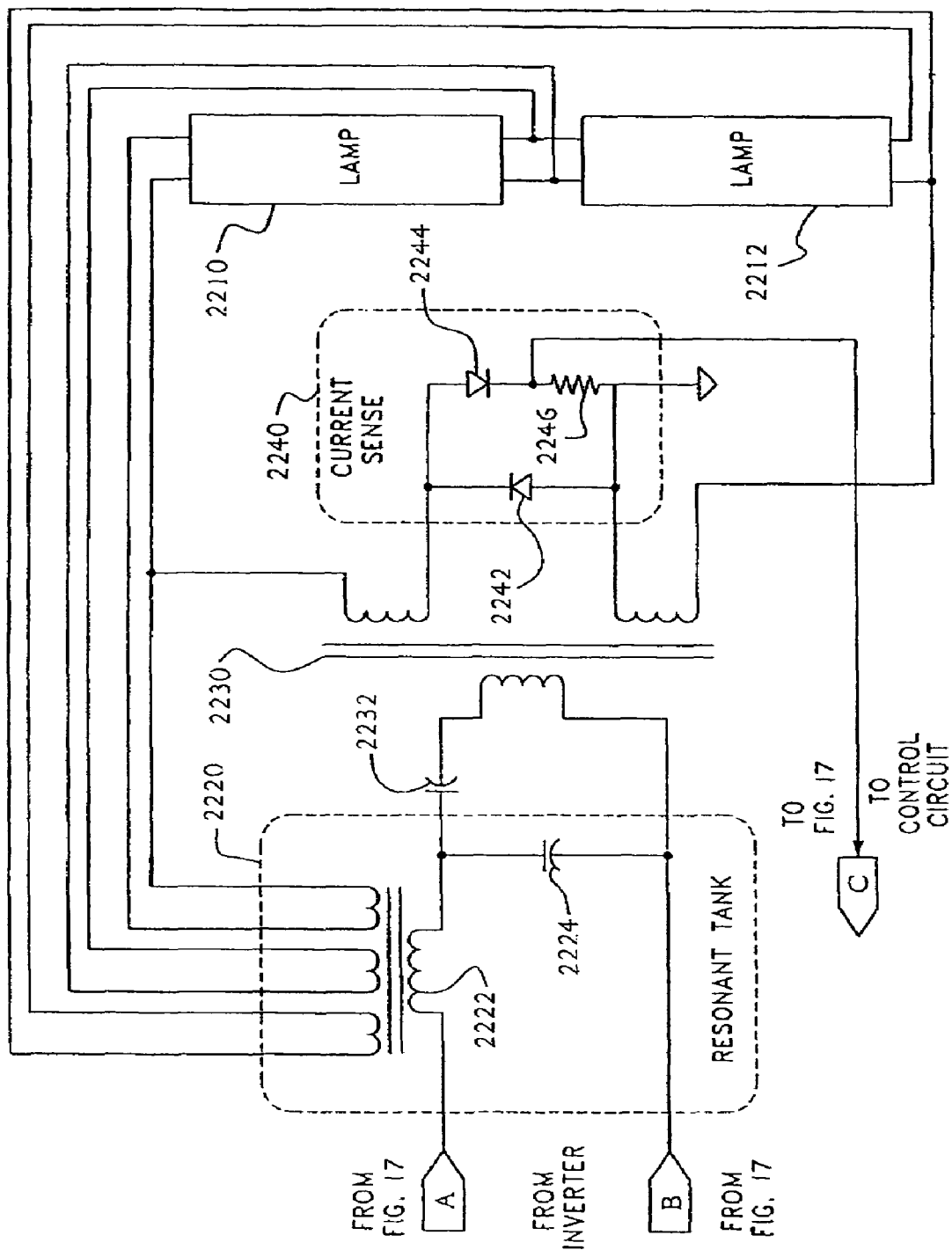

As can be seen in FIGS. 17 and 18, connected to the output of the bus capacitor 916 and the buck converter 1510 is a high-frequency DC-to-AC inverter 2110 for providing a high-frequency AC signal for driving a gas discharge lamp. The inverter 2110 includes series-connected first and second switching devices 2112 and 924. The bus voltage is the greater of either the rectified line voltage, or the voltage across the bus capacitor 916. When the input line voltage is greater than the voltage on the bus capacitor 916, then the inverter 2110 draws current directly from the AC line. When the rectified line voltage is less than the bus capacitor 916 voltage, then the inverter draws current from the capacitor 916.

Figure 19:
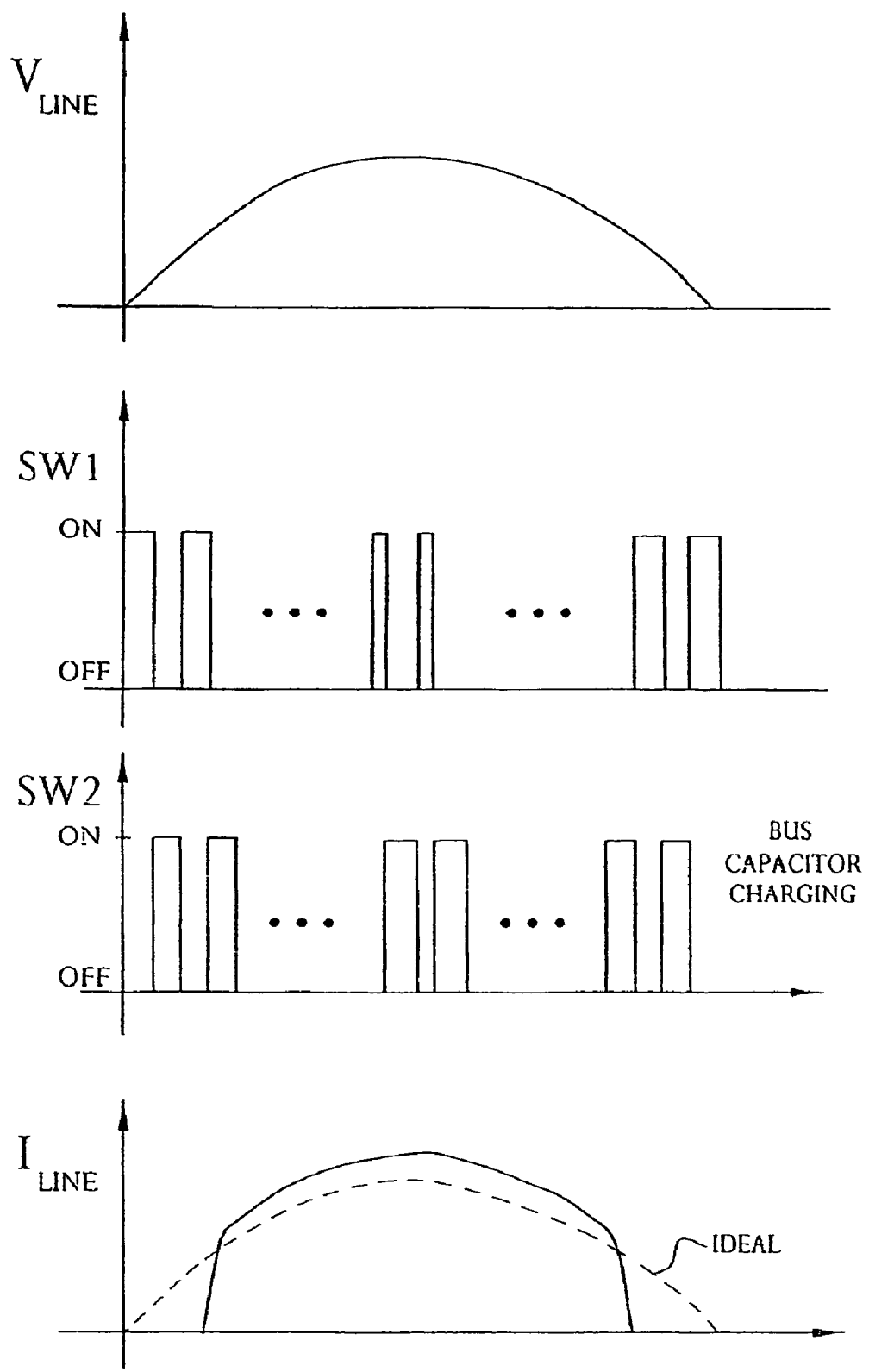
FIG. 19 is a simplified diagram illustrating the duty cycle of the inverter switches changing over a half-cycle of the line voltage, and the resultant line current drawn by the ballast.

The operation of the inverter 2110 will now be described in connection with FIG. 19. The inverter 2110 uses a fixed frequency, D(1-D) complementary duty cycle switching mode of operation. This means that one, and only one, of the switching devices 2112, 924 is conducting at all times. In this discussion, the duty cycle D refers to the conduction time of the first switch 2112, and the complementary duty cycle 1-D refers to the conduction time of the second switch 924. When switch 2112 (referred to in FIG. 19 as SW1) is conducting, then the output of the inverter 2110 is pulled upwardly toward the bus voltage. When the switching device 924 (referred to as SW2 in FIG. 19) is conducting, then the output of the inverter 2110 is pulled downwardly toward circuit common. Maximum output is achieved when the duty cycle D is equal to 0.5, that is, when the conduction times of the two switching devices 2112, 924 are equal. This occurs near the tails of each line voltage half-cycle, that is, near the line voltage zero crossings. The conduction times of the switching devices 2112, 924 are controlled by a control circuit 882 in response to the current flowing through the gas discharge lamps 2210, 2212. The operation of the control circuit is described in detail below. The control circuit 882 drives the inverter switches 2112, 924 in a manner so that more line current is drawn by the ballast near the peak of each line half-cycle, and less current is drawn near the zero crossings. A more nearly sinusoidal input current waveform is achieved, as shown in FIG. 19. This results in improved power factor and input line current THD.

The Resonant Tank

Referring again to FIGS. 17, 18, the output of the inverter 2110 is connected to a resonant tank circuit 2220 comprising an inductor 2222 and a capacitor 2224. The resonant tank 2220 filters the inverter 2110 output voltage to supply essentially sinusoidal voltage to the lamps 2210, 2212. In addition, the resonant tank 2220 provides voltage gain and increased output impedance. The output of the resonant tank 2220 is coupled to the electrodes of the gas discharge lamps 2210, 2212 by means of a transformer 2230. A DC blocking capacitor 2232 prevents DC current from flowing through the primary windings of the transformer 2230.

The Current Sense Circuit

Referring to FIG. 18, the ballast also includes a current sense circuit 2240 comprising first and second diodes 2242 and 2244, and resistor 2246, coupled in series with the lamps 2210, 2212. The current sense circuit 2240 generates a half-wave rectified voltage that is proportional to lamp current and represents a measure of actual light output. The half-wave rectified voltage is supplied as an input to the control circuit 882 of FIG. 17. In an alternative embodiment, the current sensing may be performed in a well-known manner by using a current transformer, or alternatively, a full-wave rectification diodes. For non-dimming ballasts, and dimming ballasts where only modest performance is required, the current sense circuit may be omitted.

The Control Circuit

Figure 20:
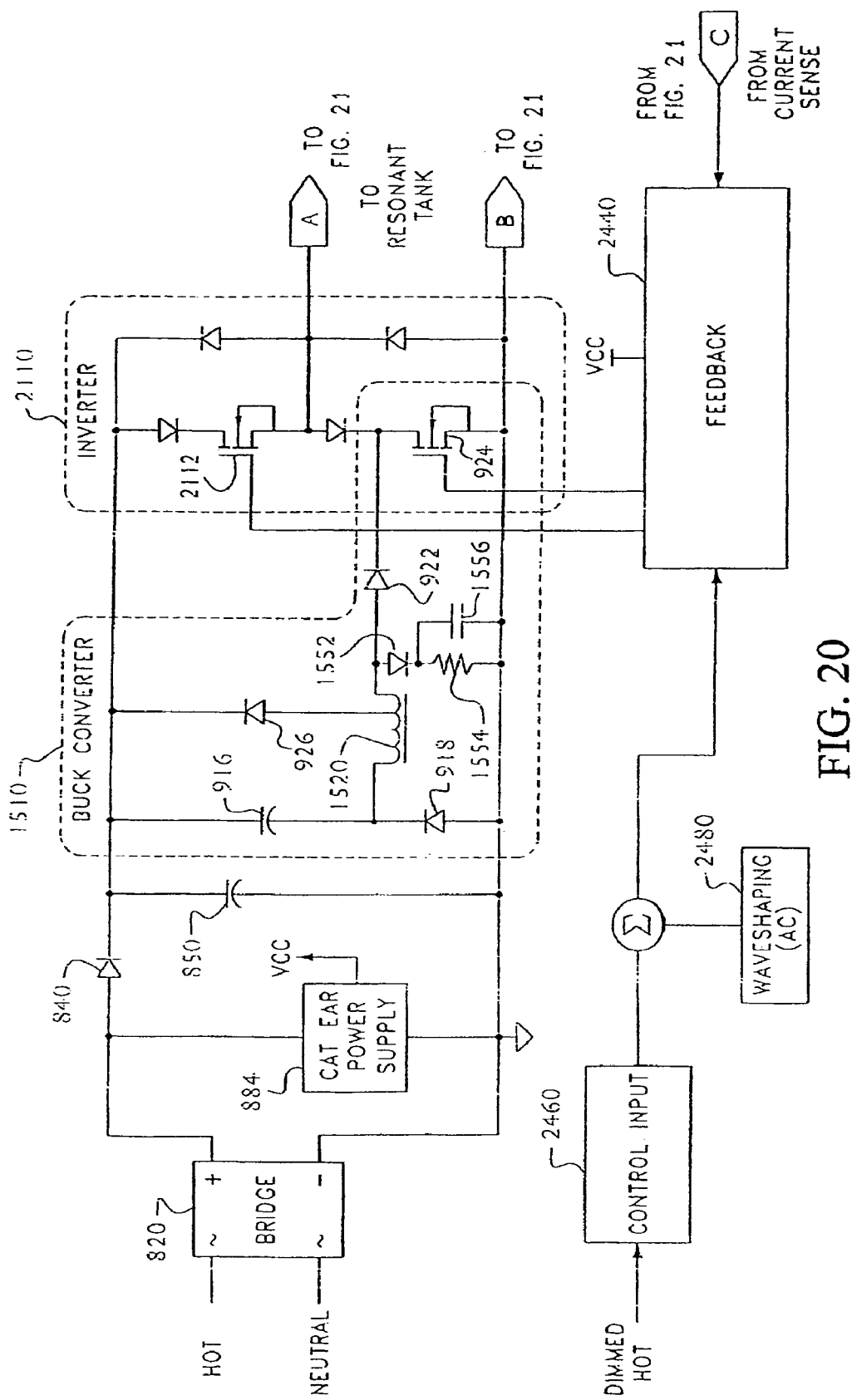
FIGS. 20 and 21 are simplified schematic diagrams of a second embodiment of an electronic ballast constructed in accordance with the invention.
Figure 21:
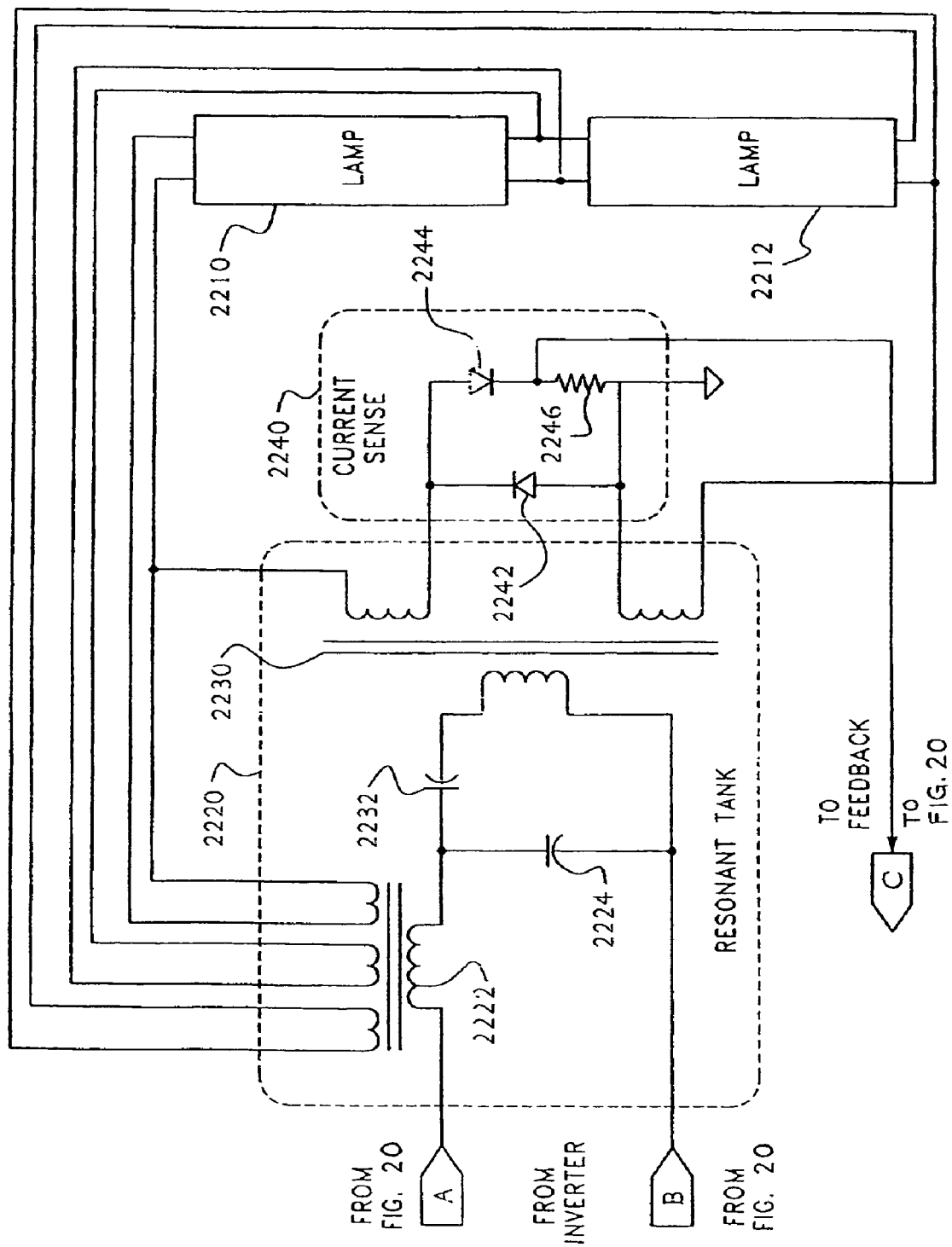

The control circuit 882 will be described with reference to FIGS. 20, 21, and 22. A first embodiment of the control circuit 882 generates output drive signals to control the conduction of the switching devices 2112 and 924. The control circuit 882 receives as an input the half-wave rectified voltage from the current sense circuit 2240 and generates a DC voltage that represents actual light output from the lamps. This DC voltage, representative of light output, is compared to a reference voltage, indicative of a desired light level, to adjust the duty cycles of the switching devices 2112, 924 so as to minimize the difference between the light output voltage and the reference voltage. In a dimming electronic ballast, the reference voltage may be provided by an external input such as a 0-to-10 Volt control signal. Alternatively, the reference voltage may be generated by detecting a phase angle control signal applied to the ballast by means of the AC line voltage. In yet another embodiment, the reference voltage may be generated from a phase angle control signal applied to the ballast via an additional input to the ballast, such as is depicted in FIGS. 20, 22 by the "Dimmed Hot" input.

The control circuit includes a feedback circuit 2440 connected to receive inputs from the current sense circuit 2240 and a control input circuit 2460, and supplies drive signals to the gates of the switches 2112 and 924. The control circuit may optionally include a waveshaping circuit 2480 to provide an additional input to the feedback circuit 2440, as will be described in detail below.

Figure 22:
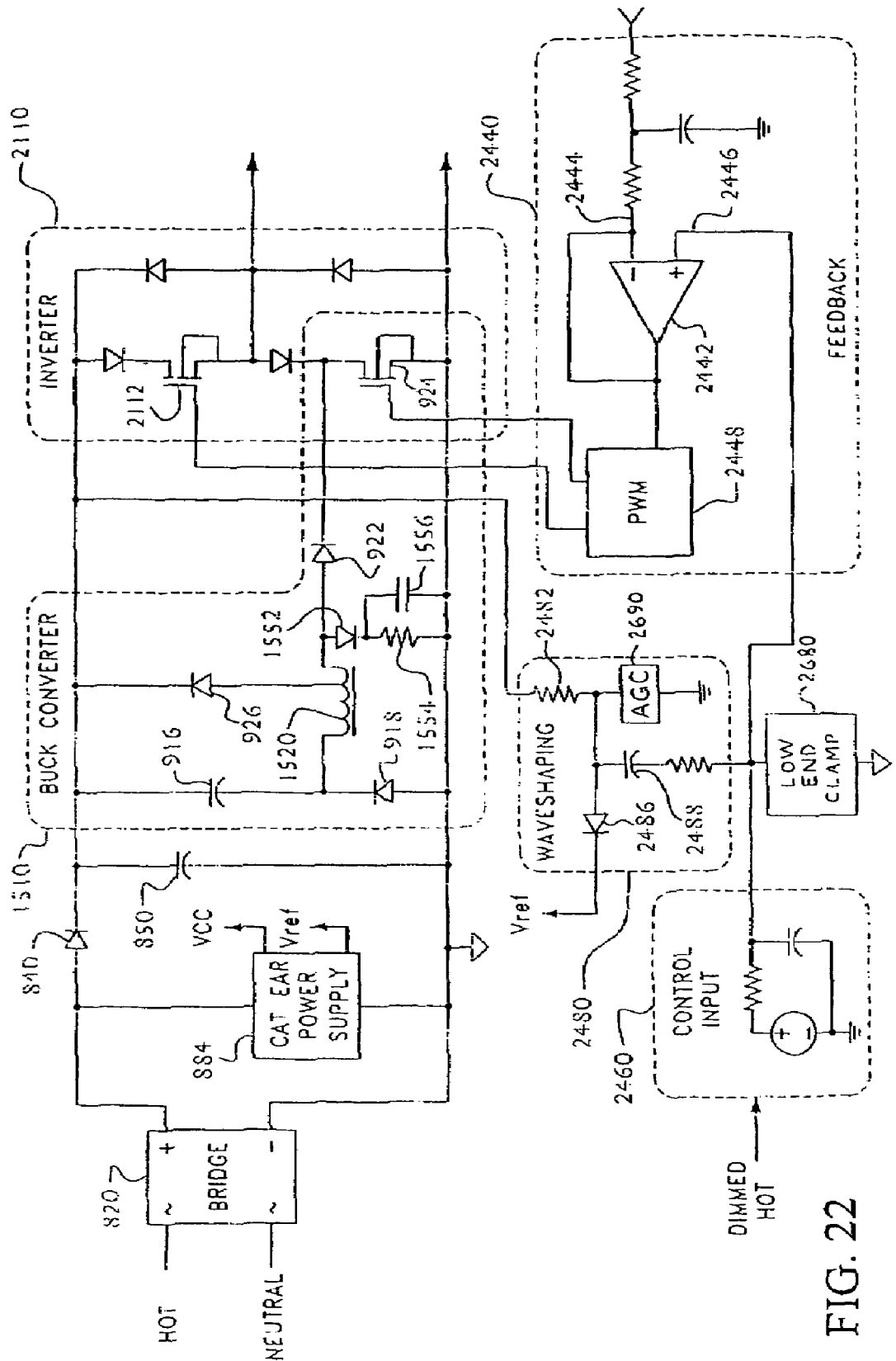
FIG. 22 is a simplified partial schematic diagram of the ballast of FIGS. 20 and 21 showing details of the control, waveshaping, and feedback circuitry.

As can be seen in FIG. 22, the feedback circuit 2440 includes a differential amplifier 2442 connected to receive at its inverting terminal 2444 the input signal representative of lamp light output from the current sense circuit 2240, and to receive at its non-inverting terminal 2446 the desired light level reference signal. The differential amplifier 2442 produces an error signal representative of the difference between the actual light output and the desired light output. The error signal is in turn provided to a pulse-wave modulation (PWM) circuit 2448 that generates the drive signals that are applied to the gates of the inverter switches 2112 and 924. The PWM circuit 2448 is well-known in the art and hence will not be described in detail here.

The control circuit may be designed to have either a "fast" response, or a "slow" response. That is, if the control circuit has a fast response, then it will react quickly to changes in lamp drive current to alter the duty cycles of the inverter switches 2112, 924 so as to adjust the output voltage of the inverter 2110 to bring the lamp drive current back to the desired value. While a control circuit having a fast response improves the crest factor of the lamp drive current, this improvement comes at the expense of increased THD for the ballast input current.

If the control circuit has a slow response, then it will react slowly to changes in lamp drive current. A control circuit having a slow response improves the ballast input current THD, but at the expense of increased lamp drive current crest factor. Striking the appropriate balance between having a control circuit with a fast response or a slow response can be difficult.

The optional waveshaping circuit 2480 provides an additional means for controlling the rate and manner of response of the control circuit. The waveshaping circuit 2480 provides an AC reference voltage signal that is summed with the essentially DC reference voltage signal from the control input circuit 2460. While the shape of the AC reference voltage signal can be made to take on a variety of waveshapes depending upon the desires of the circuit designer and the complexity of the waveshaping circuit, a particularly effective, yet simple, circuit can be designed that takes advantage of the waveforms already present in the ballast.

Figure 23:
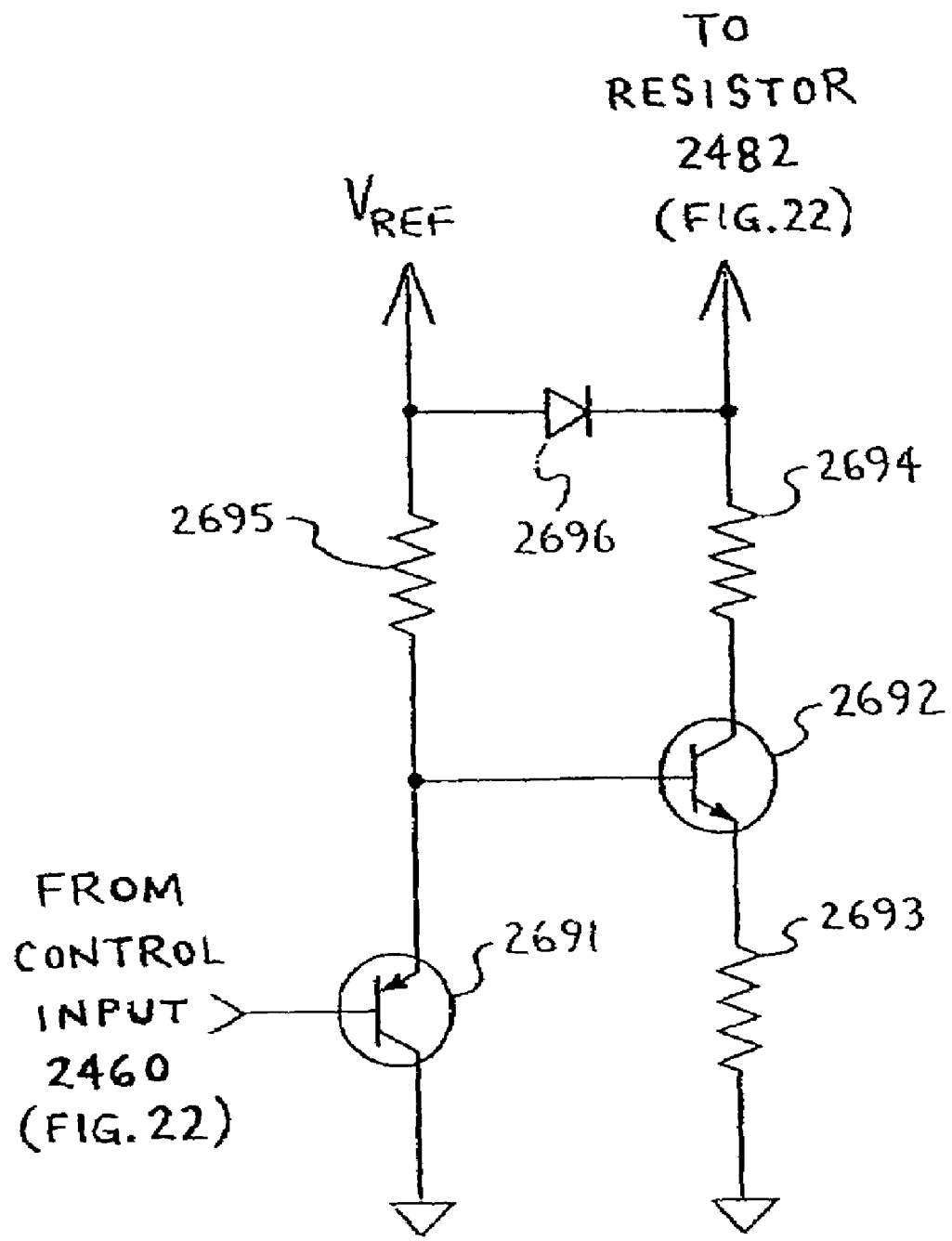
FIG. 23 is a simplified schematic diagram of an automatic gain control circuit of the waveshaping circuit of FIG. 22.

The waveshaping circuit 2480, shown in detail in FIG. 22, includes a voltage divider including a resistor 2482 connected in series with an automatic gain control (AGC) circuit 2690 that provides a scaled version of the bus voltage from the buck converter 1510. Details of the AGC 2690 are shown in FIG. 23 and discussed below. If it is not necessary to adjust the gain of the waveshaping circuit 2480, such as in non-dimming ballasts, then the AGC 2690 may optionally be replaced by a passive impedance element, such as a resistor.

The scaled voltage signal from the divider is clipped by means of a diode 2486 having its anode connected to the output of the divider and its cathode connected to a DC reference voltage VREF. The clipped signal is then passed through a DC blocking capacitor 2488 to be summed with the DC reference voltage from the control input circuit 2460.

The control circuit also includes a low end clamp 2680 connected between the common tie point for the control input, waveshaping, and feedback circuitry, and circuit common. The low end clamp 2680 prevents the reference voltage from going so low that the current through the lamp cannot be sustained. This prevents the lamp from having to be re-struck each half-cycle.

The addition of the AC reference signal has the effect of reducing the combined reference voltage when the bus voltage is lower, such as near the zero crossings of the input line voltage, and increasing the combined reference voltage as the bus voltage is increasing, such as when the input line voltage is approaching a peak. The desired lamp current supplied to the lamp by the inverter 2110 will likewise be less when the bus voltage is lower, and increasing when the bus voltage is increasing. Thus, the addition of the AC reference signal, which tracks or follows the bus voltage, has the effect of shaping the current drawn by the lamp to the bus voltage, thereby improving the power factor and THD of the line current drawn by the ballast. However, this improvement in power factor and THD comes at the expense of greater lamp CCF.

An additional feature of the waveshaping circuit 2480 is the diode 2486 for clipping the peaks of the AC reference signal. During the time when the AC reference voltage signal is clipped, the combined reference voltage remains constant while the bus voltage is peaking. The overall response of the control circuit is designed to be "fast", so the control circuit responds quickly during the peaks in the bus voltage so as to reduce the duty cycle of switch 2112 so as to deliver a constant voltage, and thus, a constant current, to the lamp. The net effect is to "shave off" the peaks of the lamp drive current envelope by reducing the duty cycle of the switch 2112 so as to reduce peak lamp drive current, and thus reduce lamp CCF. At the same time, the duty cycle of switch 924 increases, thereby increasing the charging time, and hence, the charging current drawn by the bus capacitor 916, so as to keep the line current drawn by the ballast more nearly sinusoidal so as to reduce ballast input current THD. Electronic dimming ballasts constructed with the waveshaping circuit as described have achieved stable operation with ballast input current THD below 20 percent and lamp drive current crest factor below 1.7.

Figure 24:
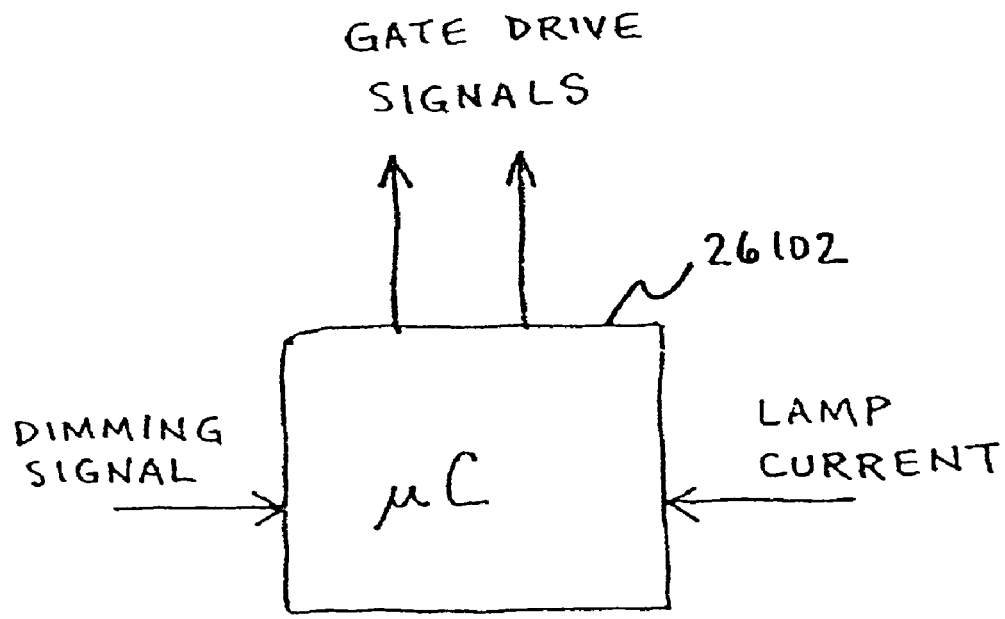
FIG. 24 is a simplified block diagram of a second embodiment of the feedback circuit of FIG. 20.

The AGC circuit 2690, shown in FIG. 23, reduces the gain of the waveshaping circuit 2480 when it is desired to dim the lamp. The AGC circuit 2690 includes first and second transistors 2691 and 2692, resistors 2693, 2694, and 2695, and diode 2696. The conduction of the first transistor 2691 is controlled by the output of the control input 2460 (FIG. 22). When the input voltage goes low, indicating a dimming condition, conduction of the first transistor 2691 decreases, raising the voltage at the base of the second transistor 2692, thereby causing the second transistor 2692 to become more conductive, effectively lowering the impedance of the AGC circuit 2690 presented to the waveshaping circuit 2480, resulting in lower gain for the sampled waveform. Raising the input voltage, such as when it is desired to increase the light level, causes the first transistor 2691 to become more conductive, lowering the voltage at the base of the second transistor 2692, thereby causing the second transistor 2692 to become less conductive, thereby causing the AGC circuit 2690 to present an effectively greater impedance to the waveshaping circuit 2480, thereby increasing the gain of the sampled waveform. A second embodiment of the feedback circuit 2440 of FIG. 20 is shown in FIG. 24 and includes a microcontroller 26102 coupled to receive as inputs representative of the desired light level and the lamp current, and produce as outputs signals for driving the gates of the inverter switches. One such microcontroller suitable for use is manufactured by Motorola Corporation under the model number MC68HC08. For simplicity, analog-to-digital and digital-to-analog circuits necessary for interfacing the microcontroller 26102 with the analog circuitry of the ballast are considered to be within the ordinary skill of the art and are not shown here.

Figure 25:
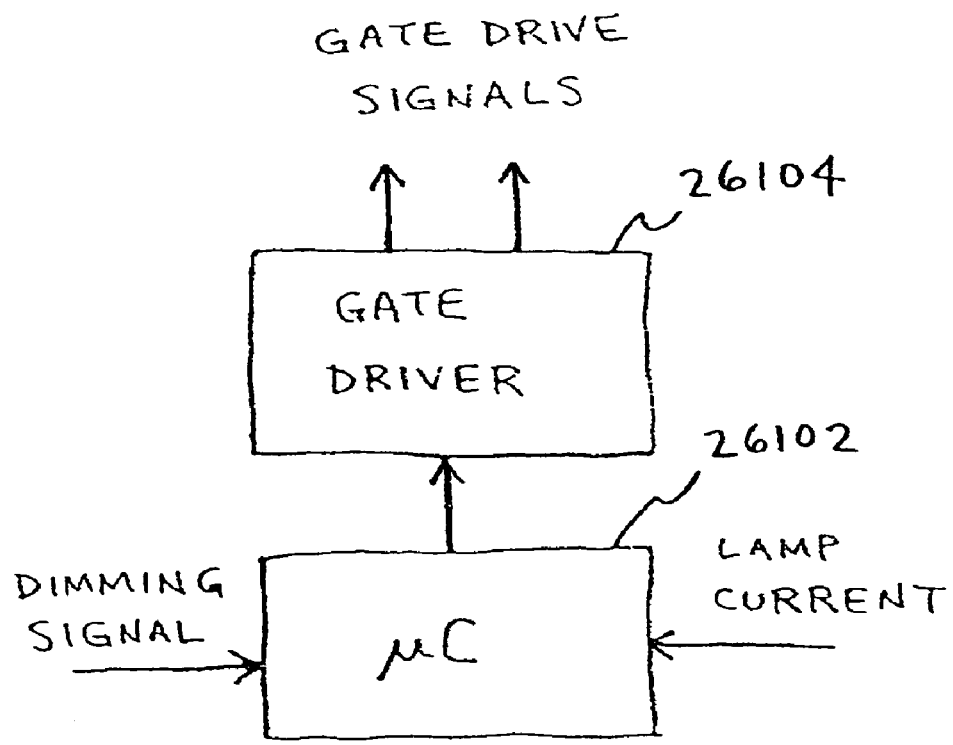
FIG. 25 is a simplified block diagram of a third embodiment of the feedback circuit of FIG. 20.

A third embodiment of the feedback circuit 2440 of FIG. 20 is shown in FIG. 25 and includes in addition to the microcontroller 26102 a gate driver circuit 26104 that receives a single gate drive signal from the microcontroller 26102 and produces signals capable of controlling the operation of the inverter switches. One such gate driver circuit suitable for use is manufactured by International Rectifier under the part number IR2111. Of course, other suitable microcontrollers (such as a PIC16C54A from Power Integrations) and gate drivers may be substituted for the specific embodiments mentioned here. In addition, an application specific integrated circuit (ASIC) (not shown) may be substituted to provide the same functionality as the microcontrollers disclosed herein.

Figure 26:
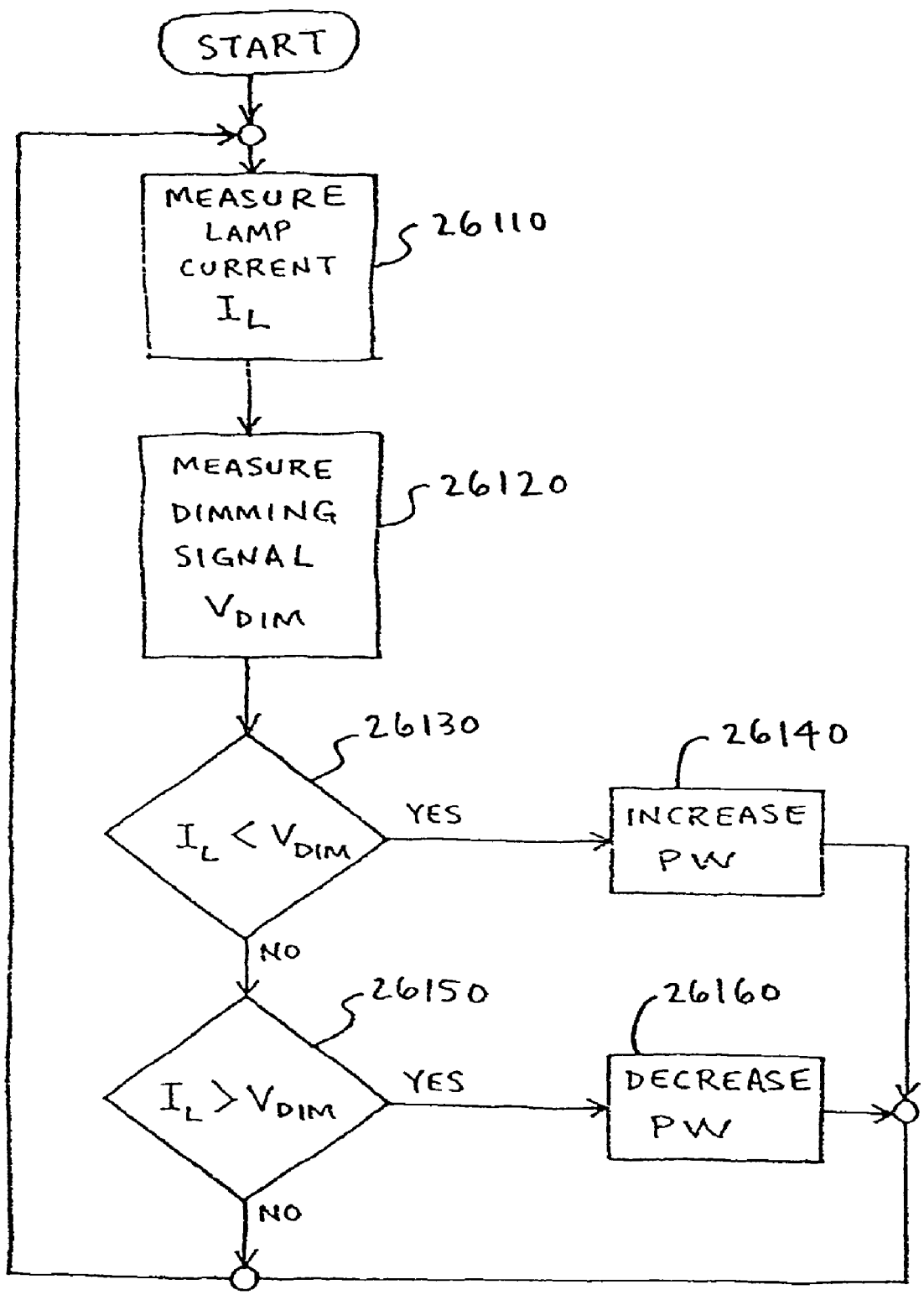
FIG. 26 is a simplified flowchart illustrating the operation of the feedback circuits of FIGS. 24 and 25.

A high-level flowchart illustrating the operation of the feedback control circuit embodiment of FIGS. 24 and 25, shown in FIG. 26, includes the steps of measuring the lamp current IL (step 26110), and measuring the dimming signal VDIM representative of the desired light level (step 26120). The measured lamp current IL is compared to the measured dimming signal VDIM (step 26130) and, if IL is less than VDIM, then the duty cycle D of the inverter is increased by increasing the pulse width of the gate drive signal (step 26140). If IL is greater than VDIM, as determined in step 26150, then the duty cycle D is decreased by decreasing the pulse width of the gate drive signal (step 26160). If IL is equal to VDIM, then the duty cycle remains unchanged and the process repeats.

The Cat Ear Power Supply

Figure 27:
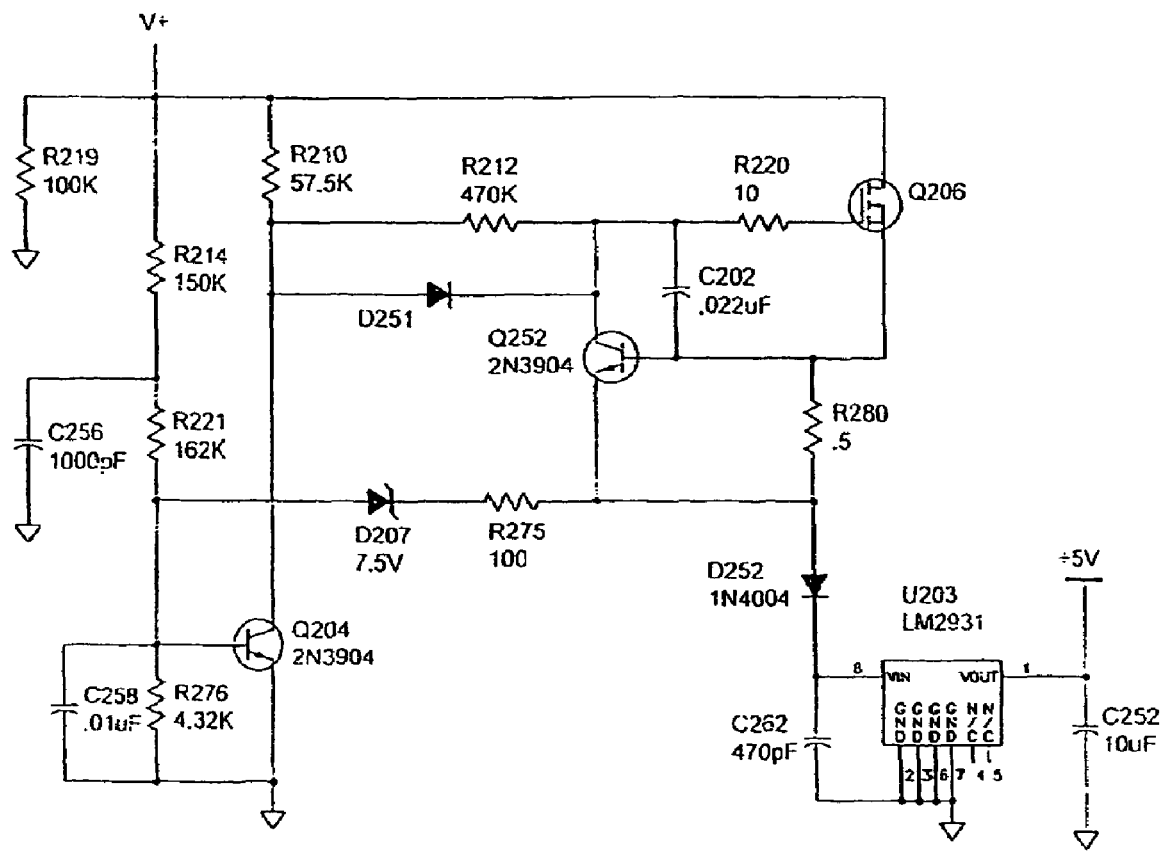
FIG. 27 is a simplified schematic of a prior art cat ear power supply.

Cat ear power supplies have been used for years to provide power for control circuits in two-wire, triac-based dimmers for incandescent lamps and fan motors. A typical prior art cat ear power supply is shown in FIG. 27. In such applications, the dimmer is located between the AC mains and the load, receiving as input sinusoidal voltage and providing as output "truncated" form of the sinusoidal input voltage in which the leading edge of the input voltage waveform is blocked by the non-conducting triac, and only the trailing portion of the input voltage waveform is passed on to the load by the triac which is turned on at a predetermined time and conducts until the next zero crossing of the input voltage waveform. By varying the phase conduction angle of the triac, the amount of power delivered to the load may be controlled. The prior art cat ear power supply draws power from the AC mains during a portion of the input voltage waveform when the triac is not conducting. In other words, the prior art cat ear power supply draws current from the line during the time that the load is "off line". However, until now, cat ear power supplies are not believed to have been used for the purpose of deliberately shaping the current drawn from the line by an electronic ballast (or other electronic devices, such as switch-mode power supplies or line-to-DC converters) so as to improve the power factor and THD of the ballast (or other electronic device) by rendering the current drawn by the ballast more nearly sinusoidal.

The novel ballast of the invention includes a cat ear power supply 884 (FIG. 20) connected across the outputs of the rectifier 820. The cat ear power supply may be generally defined as a power supply that is designed to draw current from the line during predetermined portions of the line cycle. The cat ear power supply may thus be used for shaping the ballast input current waveform so as to improve ballast power factor and ballast input current THD. Indeed, the cat ear power supply may be used for shaping the input current waveform of a variety of electronic devices, such as the previously mentioned switch-mode power supplies and line-to-DC converters, for the purpose shaping the input current waveform, improving power factor, and reducing input current THD.

Figure 28:
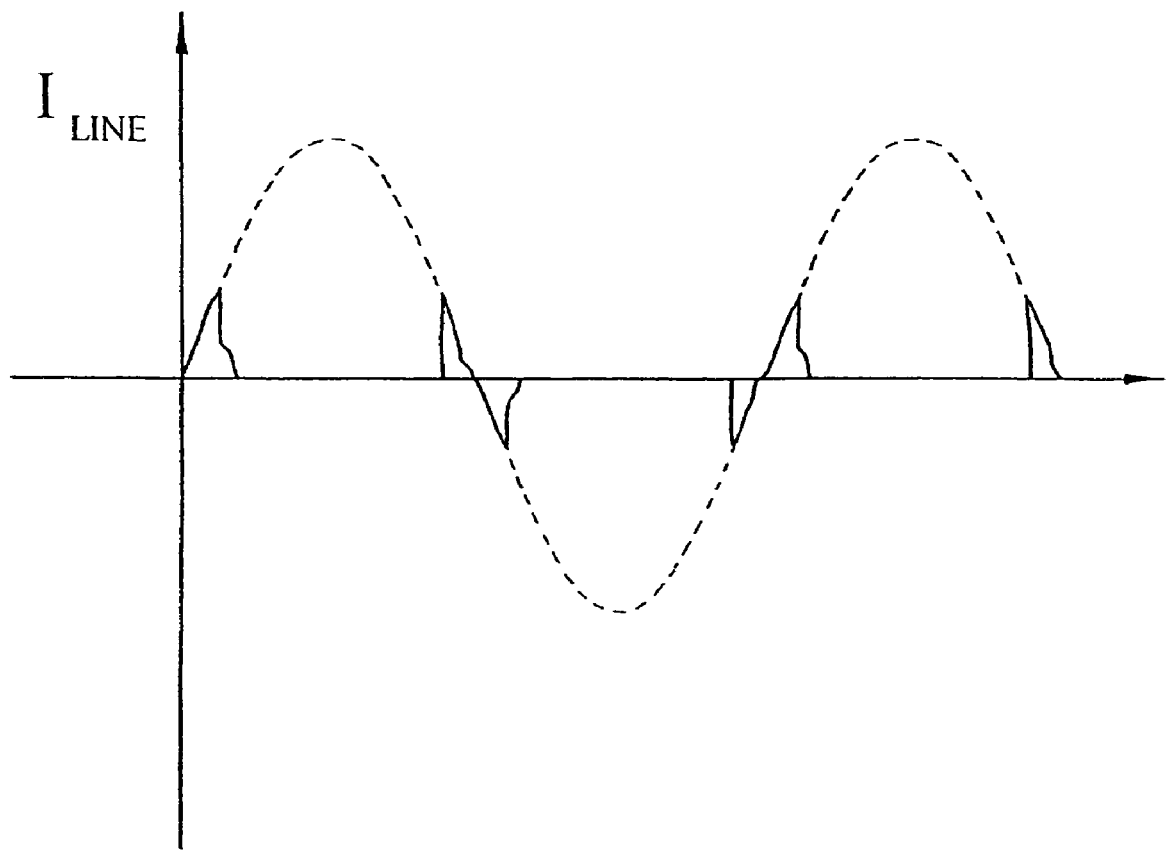
FIG. 28 is a simplified waveform diagram illustrating the line current drawn by the cat ear power supply of FIGS. 20 and 22.

The cat ear supply 884 (FIG. 2) draws current from the rectifier 820 only at the "tails" of the input line cycle, that is, the regions of the input line cycle adjacent to the line voltage zero crossings, as shown in FIG. 28. The cat ear power supply 884 "fills in" the tails of the input line current drawn from the AC mains by the ballast when the back end of the ballast is not drawing current from the line. By filling in the tails, the line current drawn by the ballast is made more nearly sinusoidal, thereby reducing input line current THD, and improving power factor.

Figure 29:
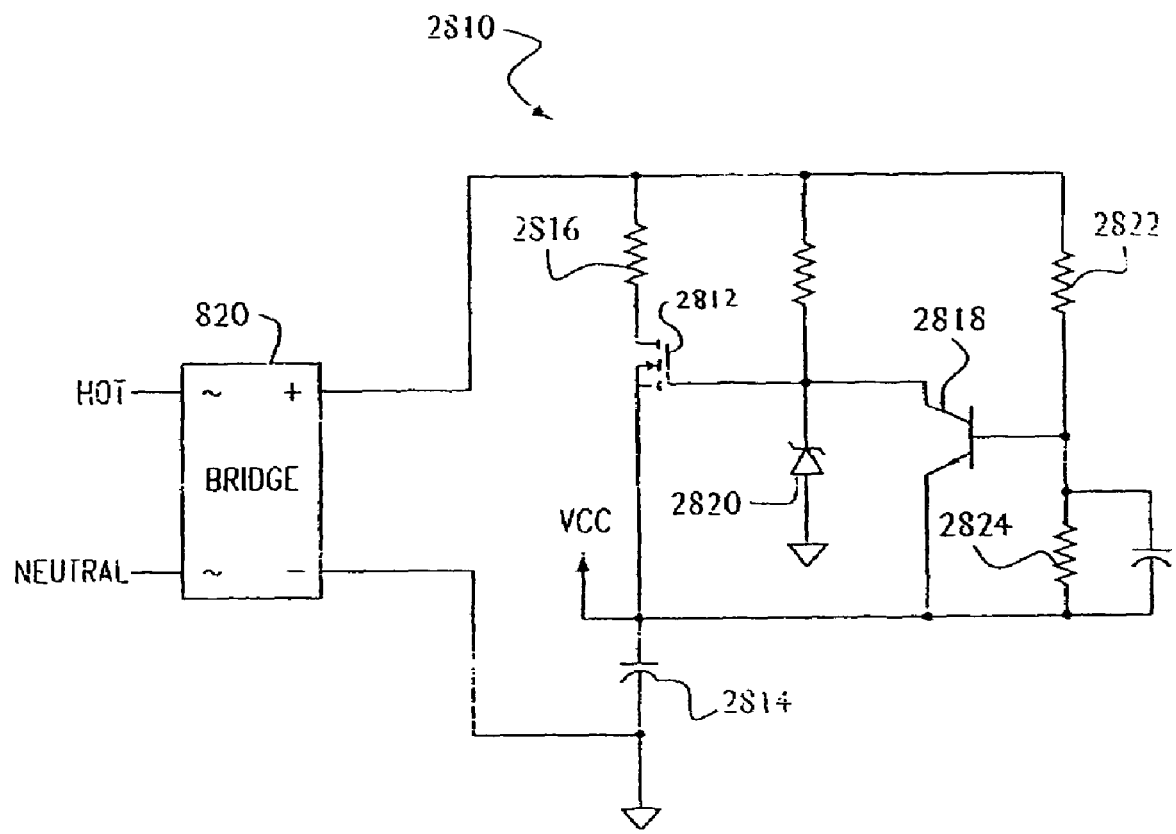
FIG. 29 is a simplified schematic diagram of a first embodiment of a cat ear power supply having fixed cut-in and cut-out points in accordance with the invention.

In a first embodiment 2810 of the cat ear power supply 884, shown in FIG. 29, the cat ear power supply 2810 is designed with fixed voltage cut-in and cut-out points. That is, the first embodiment 2810 of the cat ear power supply will only draw current from the AC mains when the rectified line voltage is below a fixed value. This condition will occur from a predetermined time before a line voltage zero crossing to a predetermined time after the line voltage zero crossing. The cut-out and cut-in voltage points can be adjusted so that the cat ear power supply 2810 draws current during a first interval from a time just after the line voltage zero crossing to a time when the bus capacitor 916 begins drawing charging current from the line, and during a second interval from a time when the bus capacitor 916 stops drawing charging current from the line until the next line voltage zero crossing.

When the rectified line voltage is lower than a predetermined voltage, a charging transistor 2812 conducts to allow charging of energy-storage device capacitor 2814, which charges toward a voltage VCC. The rate of charge of the capacitor 2814 is determined by a resistor 2816 in series with the drain of the MOSFET transistor 2812, which, in conjunction with the value of the capacitor 2814, can be chosen so as to substantially match the value of VCC to the predetermined cut-out and cut-in voltages. This allows for a substantially piece-wise continuous ballast input current. Although the transistor 2812 is shown as a MOSFET, it may be any suitable controllably conductive device, such as, without limitation, a BJT or an IGBT.

When the rectified line voltage is equal to or greater than the predetermined voltage, then cut-out transistor 2818 begins conducting. The collector of the cut-out transistor 2818 pulls the cathode of a Zener diode 2820 toward VCC, which effectively turns off the charging transistor 2812. The predetermined cut-in and cut-out voltages are determined by the resistive voltage divider network including resistors 2822 and 2824, to which the base of the cut-out transistor 2818 is connected.

Figure 30:
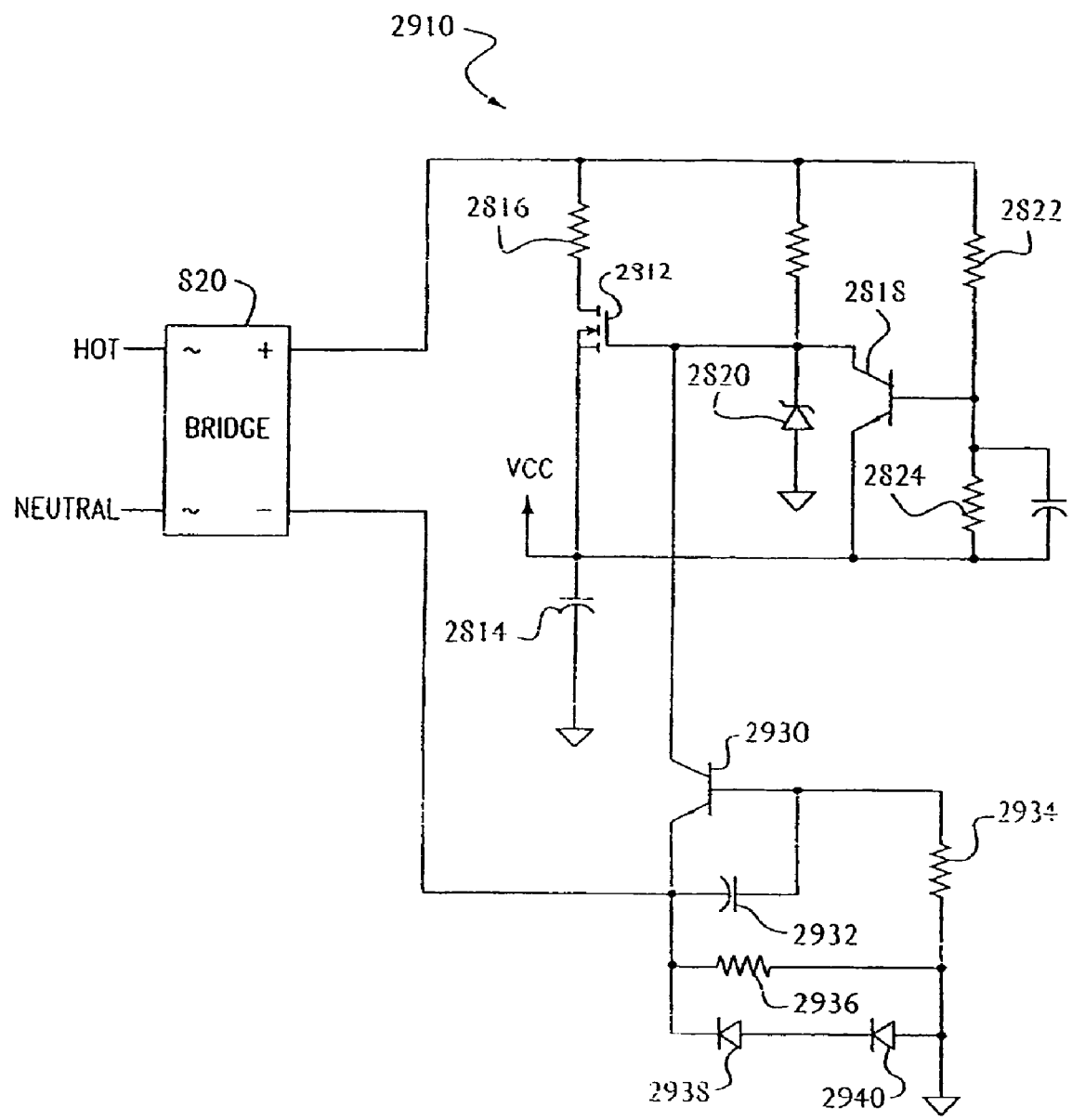
FIG. 30 is a simplified schematic diagram of a second embodiment of a cat ear power supply including active monitoring of back end current.

In a second embodiment 2910 of the cat ear power supply 884, shown in FIG. 30, the cat ear supply 2910 includes a circuit that actively monitors current drawn from the back end of the ballast and only draws current from the line when the back end is not drawing current above a predetermined value. The current monitor circuit includes transistor 2930, capacitor 2932, resistors 2934 and 2936, and diodes 2938 and 2940. When the ballast back end is drawing current above the predetermined value, the voltage at the emitter of transistor 2930 goes negative by a voltage equivalent to the combined forward voltage drops of diodes 2938, 2940. The resulting forward bias across the base-emitter junction of transistor 2930 turns transistor 2930 on, effectively pulling the gate of transistor 2812 low, thereby turning off transistor 2812. When back end current falls below the predetermined value, capacitor 2932 discharges to ground, transistor 2930 turns off, allowing transistor 2812 to turn on and provide a charging path for capacitor 2814. This second embodiment yields a slight improvement in THD over the first embodiment.

In addition to providing a means for shaping the input current drawn by the ballast so as to improve power factor and THD, the cat ear power supply advantageously provides a faster start-up of the ballast and is not affected by the operating mode of the ballast in the same way that typical prior art trickle-charge and bootstrap systems are affected.

Figure 31:
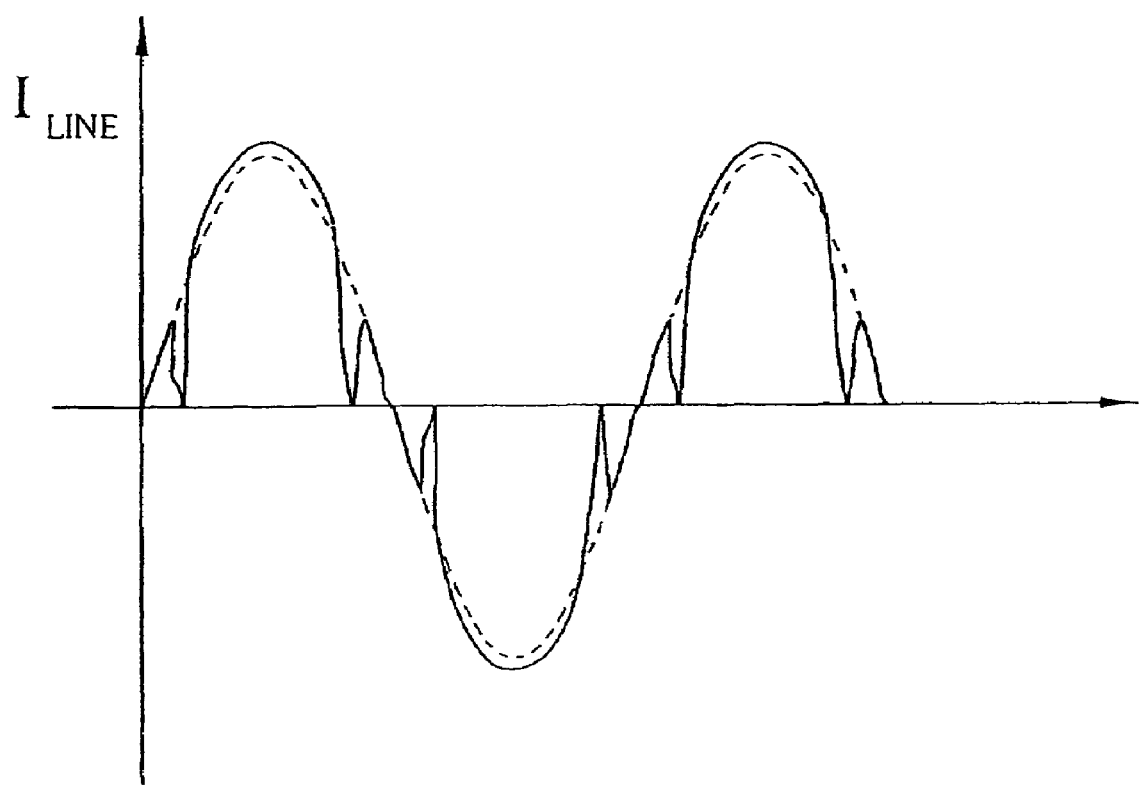
FIG. 31 is a simplified waveform diagram illustrating the line current drawn by the electronic ballast of FIGS. 20 and 21.

The result of combining the improved valley-fill circuits, control circuits, and cat ear power supply of the present invention may be seen in FIG. 31.

The cat ear power supply comprises means for drawing input current near the zero crossing of the AC input voltage waveform so that the input current THD is substantially reduced. In other words, the cat ear power supply fills in the current waveform near the zero crossings.

The improved valley-fill circuits of the invention comprise means for storing energy in an energy storage device over a substantial portion of each half-cycle of the AC input voltage so that the ballast power factor and THD are substantially improved. This is depicted in FIG. 31 wherein it may be seen that the middle portion of each line half-cycle current waveform conforms substantially to an ideal sinusoidal current waveform.

The combination of the cat ear power supply and the improved valley-fill circuits comprises means for selectively drawing current from the AC power supply so that the input current to the ballast is essentially sinusoidal.

The operation of the ballast is further enhanced by the control circuit disclosed herein which comprises means for selectively varying the complementary duty cycles of the inverter switches in response to the bus voltage so as to cause an energy storage device to draw more current from the AC power supply around the peak of each line half-cycle of the bus voltage, and draw less current near the troughs of each line half-cycle of the bus voltage.

While the embodiments heretofore described have been primarily directed to improving the THD, lamp current crest factor, and power factor of an electronic ballast, either of the dimming or non-dimming variety, the inventors believe that provision of an independent power supply in an electronic ballast is itself novel. That is, insofar as the inventors have been able to discover, all prior art electronic ballasts that have included control circuits for controlling the operation of an inverter stage have drawn the power for operating such control circuits from a transformer within the ballast, usually associated with the inverter stage, or an AFPC stage. This is so because such transformers have been present for the normal operating functions of the ballast. It is very easy to provide an additional secondary winding on such transformers for the purpose of drawing off power to drive the control circuits.

Unfortunately, while it may be more cost effective to simply add another secondary winding to an already present transformer, it becomes more complicated to start up the ballast in a controlled manner upon application of power. This has lead to more complex circuitry for handling abnormal and transient conditions within such ballasts.

The provision of an independent power supply, that is, one that derives its power directly from the line at the front end of the ballast, either through the ballast's own rectifier stage, or through its own dedicated rectifier, rather than from the secondary of a transformer associated with the ballast back end, greatly simplifies the handling of transient conditions upon start up, shut down, and during abnormal or fault conditions. In the present case, the preferred form of such an independent power supply is the previously described cat ear power supply. Thus, the independent power supply of the preferred embodiment allows one to decouple the power supply from the back end, thereby simplifying control of the ballast, while simultaneously providing a means to more precisely control the manner in which current is drawn from the line so as to reduce THD and improve power factor.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. An electronic ballast for driving at least one lamp comprising:
   a rectifying circuit operatively connectable to an AC line for providing a rectified voltage;
   a current drawing circuit connected across said rectifying circuit;
   said current drawing circuit drawing current from said AC line only when the instantaneous voltage of said AC line nears zero to reduce the total harmonic distortion of the input current drawn by said ballast; and
   an inverter circuit connected to said rectifying circuit that supplies a lamp current to said at least one lamp.

2. The electronic ballast of claim 1, wherein said current drawing circuit is a cat ear circuit.

3. The electronic ballast of claim 2, wherein said cat ear circuit draws current from said AC line when the rectified voltage is below a fixed value.

4. An electronic ballast for driving at least one lamp comprising:
   a rectifying circuit operatively connectable to an AC line;
   a valley fill circuit including a capacitor;

said valley fill circuit operable to selectively charge said capacitor directly from said AC line through said rectifying circuit, an impedance, and a first electronic switching device; and an inverter circuit including at least one electronic switching device for supplying lamp current to said at least one lamp;

wherein said capacitor is charged during at least 90° of each half-cycle of said AC line.

5. The electronic ballast of claim 4, wherein said valley fill circuit includes a buck converter circuit.

6. The electronic ballast of claim 4, wherein said valley fill circuit includes an inductor.

7. The electronic ballast of claim 4, wherein said first electronic switching device is a MOSFET.

8. The electronic ballast of claim 4, wherein said valley fill circuit includes at least one of said at least one switching device of said inverter circuit.

9. The electronic ballast of claim 4, which further includes a flyback transformer coupled to said capacitor, to control the delivery of energy to said capacitor.

10. The electronic ballast of claim 9, wherein said flyback transformer is connected to said capacitor by a controllably conductive device.

11. An electronic ballast for driving at least one lamp comprising:

a rectifying circuit operatively connectable to an AC line;
a valley fill circuit including an energy storage device;
said valley fill circuit operable to selectively charge said energy storage device;

a back end which includes an inverter circuit that supplies a lamp current to said at least one lamp;

a control circuit for controlling the operation of said inverter circuit; and a cat ear circuit that supplies power to said control circuit;

wherein said inverter circuit draws a first current from said AC line during a first predetermined portion of each half cycle which is greater than 90° of each half cycle of said AC line and said cat ear circuit draws a second current from said AC line during a second predetermined portion of each half cycle which is less than 90° of each half cycle of said AC line.

12. An electronic ballast for driving at least one lamp comprising:

a rectifying circuit operatively connectable to an AC line;
a valley fill circuit including an energy storage device;
said valley fill circuit operable to selectively charge said energy storage device directly from said AC line through said rectifying circuit, an impedance, and a first controllably conductive switch.

13. The electronic ballast of claim 12, wherein said energy storage device is a capacitor.

14. The electronic ballast of claim 12, wherein said impedance is an inductor.

15. The electronic ballast of claim 12, wherein said impedance is a resistor.

16. The electronic ballast of claim 12, wherein said first controllably conductive switch is a MOSFET.

* * * * *